(12) United States Patent
Ishii et al.

(10) Patent No.: US 10,067,921 B2
(45) Date of Patent: Sep. 4, 2018

(54) INFORMATION PROCESSING APPARATUS, INFORMATION PROCESSING METHOD, AND INFORMATION PROCESSING PROGRAM

(71) Applicant: NEC CORPORATION, Tokyo (JP)

(72) Inventors: Satoru Ishii, Tokyo (JP); Tatsushi Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/127,318

(22) PCT Filed: Dec. 26, 2014

(86) PCT No.: PCT/JP2014/084614
§ 371 (c)(1),
(2) Date: Sep. 19, 2016

(87) PCT Pub. No.: WO2015/141101
PCT Pub. Date: Sep. 24, 2015

(65) Prior Publication Data
US 2017/0147546 A1 May 25, 2017

(30) Foreign Application Priority Data
Mar. 20, 2014 (JP) .................................. 2014-059236

(51) Int. Cl.
*G06F 17/11* (2006.01)
*G06F 17/24* (2006.01)
(Continued)

(52) U.S. Cl.
CPC .............. *G06F 17/24* (2013.01); *G06F 17/27* (2013.01); *G06F 17/2775* (2013.01); *G06F 3/0482* (2013.01); *G06F 3/0488* (2013.01)

(58) Field of Classification Search
CPC ...................................................... G06F 17/27
See application file for complete search history.

(56) References Cited

U.S. PATENT DOCUMENTS 5,617,115 A * 4/1997 Itoh ........................ G06F 17/212
345/467
5,857,185 A * 1/1999 Yamaura ............ G06F 17/30696
(Continued)

FOREIGN PATENT DOCUMENTS

CN 1896989 A 1/2007
CN 101996231 A 3/2011
(Continued)

OTHER PUBLICATIONS

JP 2010-244126 A (KDDI Corp., Osaka University) Oct. 28, 2010, English translation, pp. 1-11.*

(Continued)

*Primary Examiner* — Laurie Anne Ries
(74) *Attorney, Agent, or Firm* — Sughrue Mion, PLLC

(57) ABSTRACT

There is provided an information processing apparatus including an extractor and a display unit. To make an actually selected target coincide with a target the user wants to select from a display document, the extractor extracts a document element included in a selected range in a document based on the attribute of the document element. The display unit selectably performs list display of extraction results of the extractor. This allows the user to select a desired document element from the list display, thereby making an actually selected target coincide with a target the user wants to select from the display document.

10 Claims, 31 Drawing Sheets

(51) Int. Cl.
*G06F 17/27* (2006.01)
*G06F 3/0488* (2013.01)
*G06F 3/0482* (2013.01)

(56) References Cited

U.S. PATENT DOCUMENTS

| | | | | |
|---|---|---|---|---|
| 6,003,046 | A * | 12/1999 | Nielsen | G06F 17/30896 |
| | | | | 707/E17.118 |
| 6,205,456 | B1 * | 3/2001 | Nakao | G06F 17/30719 |
| | | | | 707/999.003 |
| 8,015,203 | B2 * | 9/2011 | Takebe | G06K 9/2081 |
| | | | | 707/602 |
| 8,812,290 | B2 | 8/2014 | Abe | |
| 9,047,283 | B1 * | 6/2015 | Zhang | G06F 17/30663 |
| 2003/0194131 | A1 * | 10/2003 | Zhao | G06K 9/46 |
| | | | | 382/190 |
| 2005/0154971 | A1 * | 7/2005 | Nagao | G06F 17/2241 |
| | | | | 715/233 |
| 2007/0083934 | A1 * | 4/2007 | McArdle | G06F 17/2211 |
| | | | | 726/26 |
| 2007/0180471 | A1 * | 8/2007 | Unz | G06F 17/3089 |
| | | | | 725/52 |
| 2008/0091706 | A1 * | 4/2008 | Suzuki | G06F 17/30637 |
| 2008/0168135 | A1 * | 7/2008 | Redlich | G06Q 10/10 |
| | | | | 709/204 |
| 2008/0187221 | A1 * | 8/2008 | Konno | G06K 9/00449 |
| | | | | 382/175 |
| 2009/0112892 | A1 * | 4/2009 | Cardie | G06F 17/30719 |
| 2009/0254572 | A1 * | 10/2009 | Redlich | G06Q 10/06 |
| 2011/0035207 | A1 | 2/2011 | Abe | |
| 2012/0179709 | A1 * | 7/2012 | Nakano | G06F 17/3061 |
| | | | | 707/769 |
| 2014/0201620 | A1 * | 7/2014 | Khona | G06F 17/30864 |
| | | | | 715/234 |
| 2014/0331127 | A1 * | 11/2014 | Chang | G06F 17/248 |
| | | | | 715/271 |

FOREIGN PATENT DOCUMENTS

| | | |
|---|---|---|
| JP | 2-32455 A | 2/1990 |
| JP | 2007-272739 A | 10/2007 |
| JP | 2007-272859 A | 10/2007 |
| JP | 2008-070942 A | 3/2008 |
| JP | 2010-244126 A | 10/2010 |
| JP | 2011-181109 A | 9/2011 |
| JP | 2013-186720 A | 9/2013 |

OTHER PUBLICATIONS

JP 2008-70942 A (Pioneer Corp., Increment P Corp.), Mar. 27, 2008, English translation, pp. 1-43.*

International Search Report of PCT/JP2014/084614 dated Feb. 10, 2015.

Communication dated May 4, 2018 issued by the State Intellectual Property Office of People's Republic of China in counterpart Chinese Patent Application No. 201480077138.X.

* cited by examiner

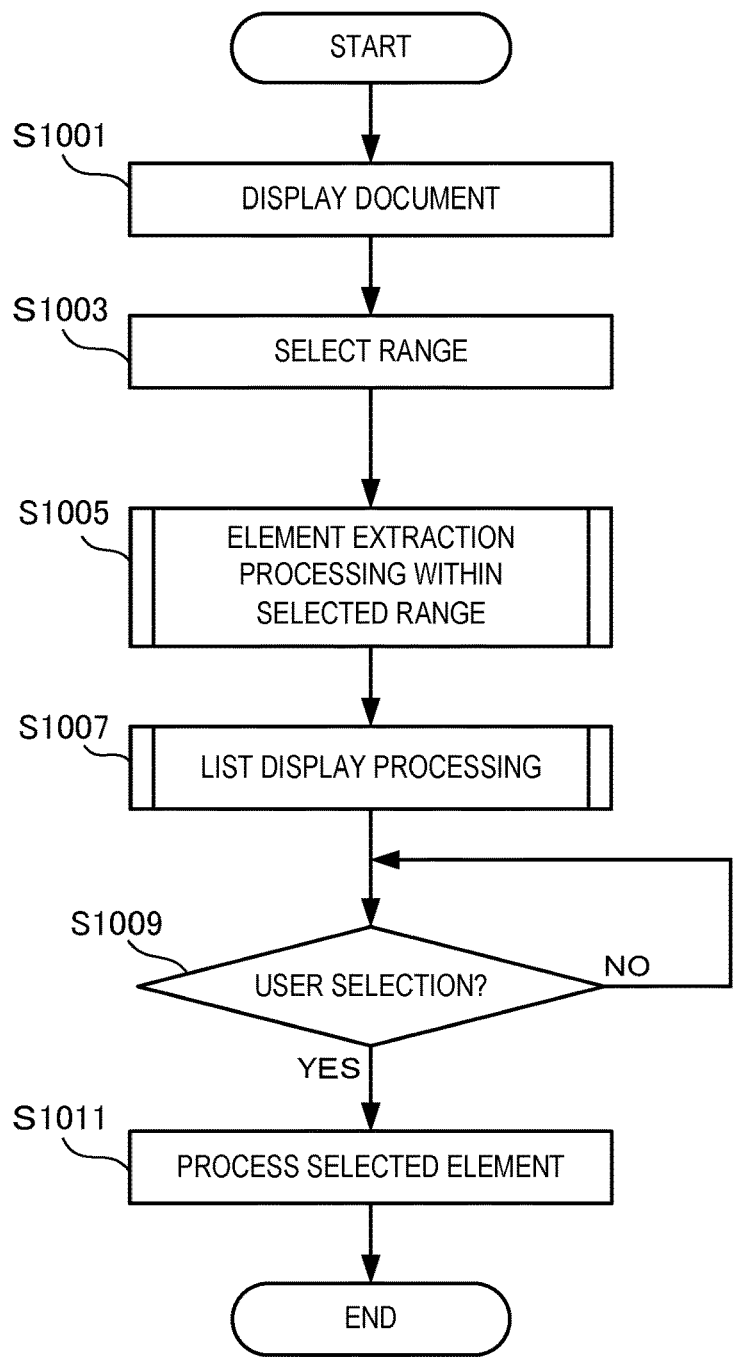
F I G. 10

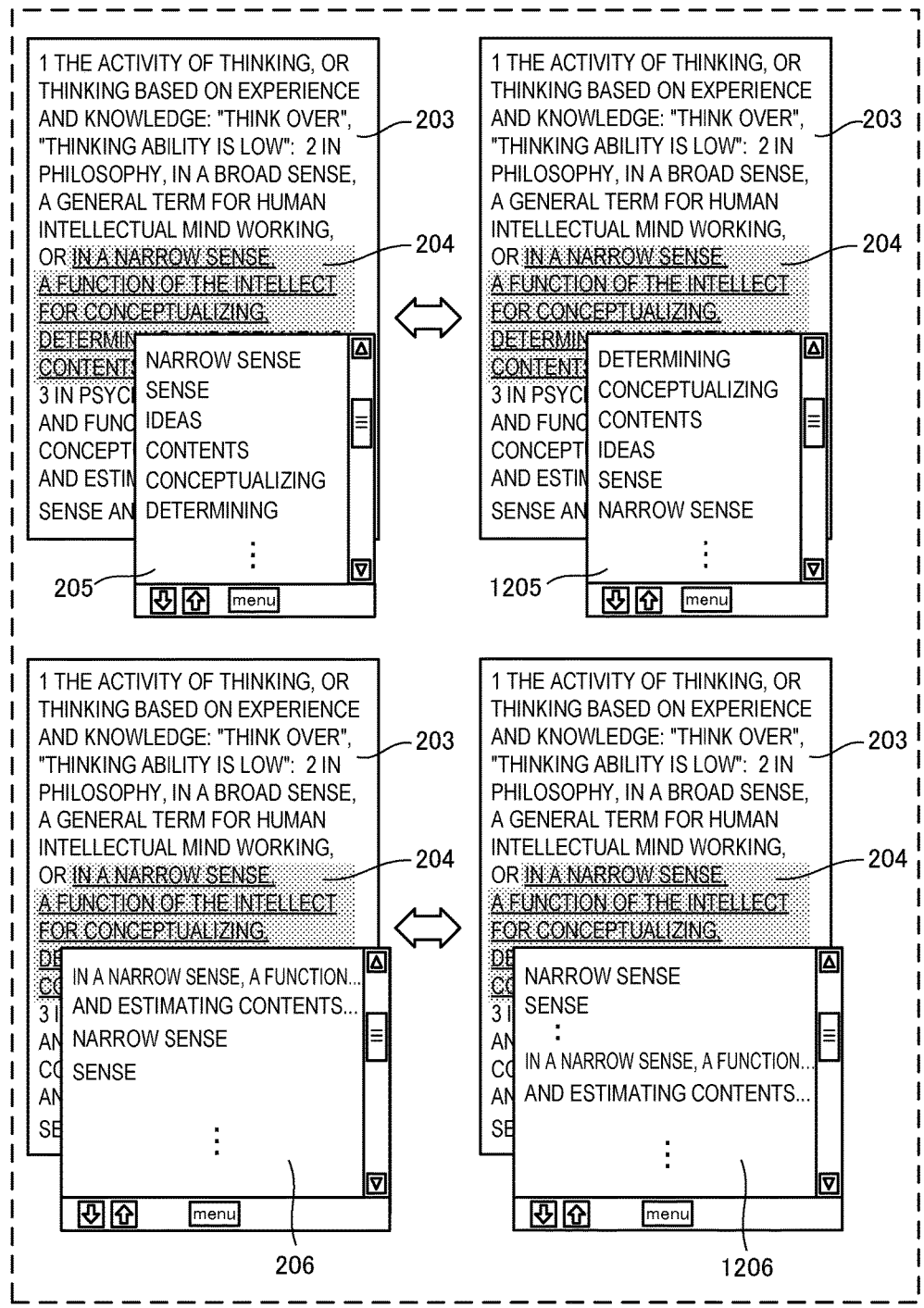
F I G. 12

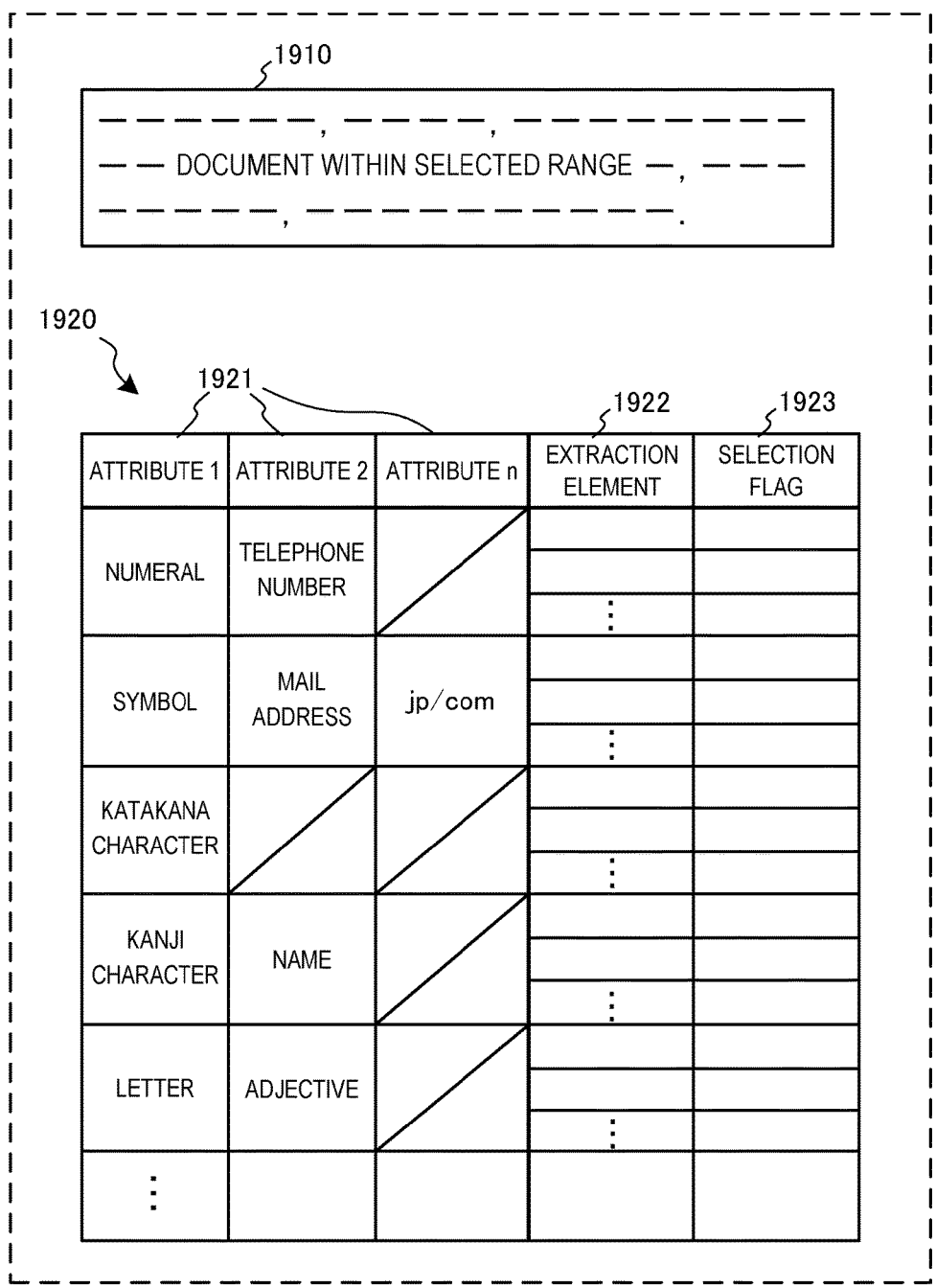
F I G. 19

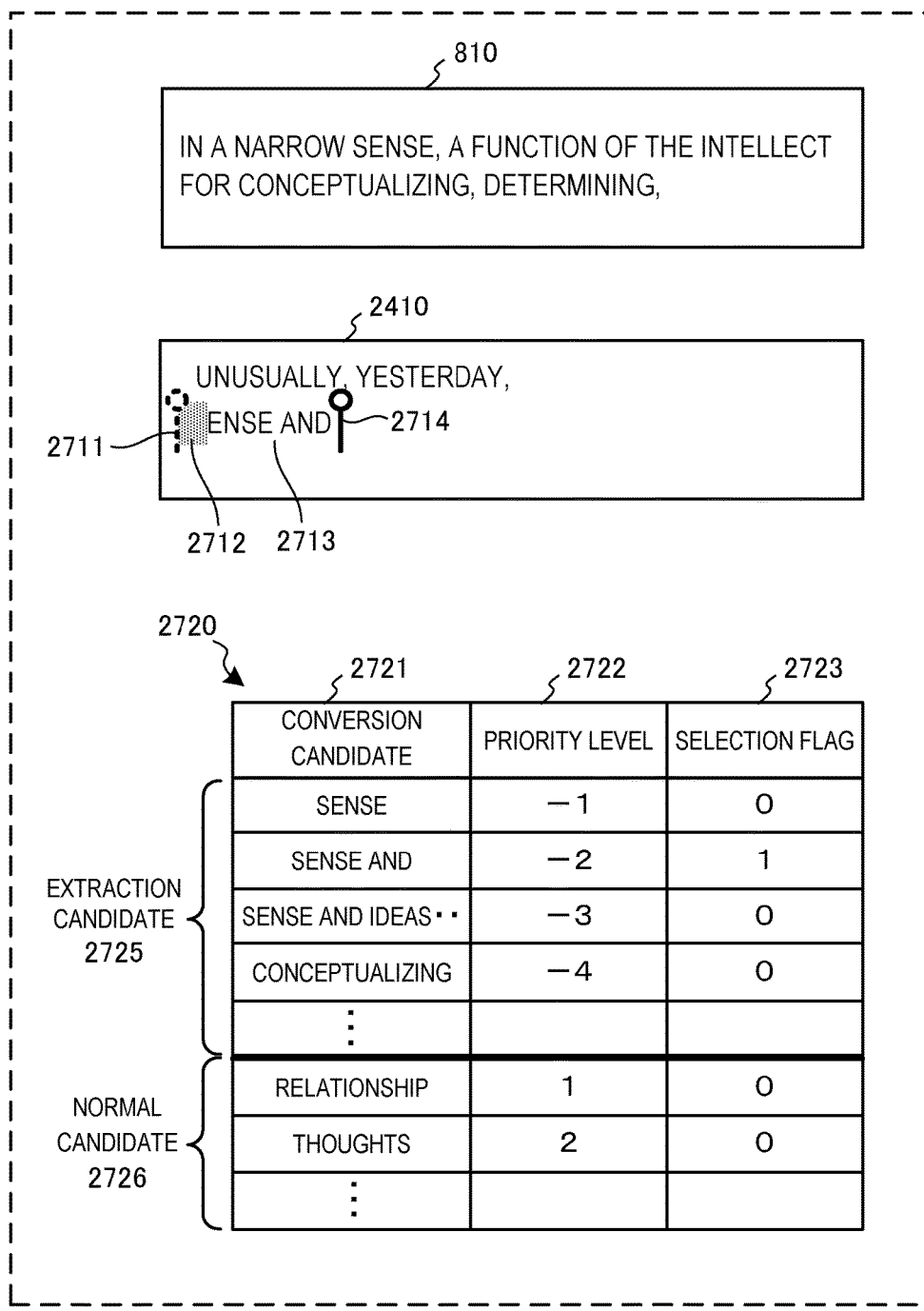
F I G. 27

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2014/084614 filed Dec. 26, 2014, claiming priority based on Japanese Patent Application No. 2014-059236, filed Mar. 20, 2014, the contents of which are incorporated herein by reference in their entirety.

TECHNICAL FIELD

The present invention relates to an information processing apparatus, an information processing method, and an information processing program.

BACKGROUND ART

In the above technical field, patent literature 1 discloses a technique of selecting a paragraph, sentence, phrase, or word designated by the user by circling a designated region on the display screen of a smartphone or tablet.

CITATION LIST

Patent Literature

Patent literature 1: Japanese Patent Laid-Open No. 2013-186720

SUMMARY OF THE INVENTION

Technical Problem

In the technique described in the above literature, however, an actually selected target does not always coincide with a target the user wants to select from a display document. Especially, it is impossible to accurately select a document element such as a paragraph, sentence, phrase, or word included in a display document from the touch panel of a smartphone, a tablet, or the like.

The present invention enables to provide a technique of solving the above-described problem.

Solution to Problem

One aspect of the present invention provides an apparatus comprising:

an extractor that extracts a document element included in a selected range in a document based on an attribute of the document element; and a display unit that selectably performs list display of extraction results of the extractor.

Another aspect of the present invention provides a method comprising:

extracting a document element included in a selected range in a document based on an attribute of the document element; and selectably performing list display of extraction results in the extracting.

Still other aspect of the present invention provides a program for causing a computer to execute a method, comprising:

extracting a document element included in a selected range in a document based on an attribute of the document element; and selectably performing list display of extraction results in the extracting.

Advantageous Effects of Invention

According to the present invention, it is possible to make an actually selected target coincide with a target the user wants to select from a display document.

BRIEF DESCRIPTION OF DRAWINGS

FIG. 10 is a flowchart illustrating the procedure of screen operation processing by the information processing apparatus according to the second embodiment of the present invention;

FIG. 12 is a view for explaining list display of selection candidates in an information processing apparatus according to the third embodiment of the present invention;

FIG. 19 is a view showing the structure of the stored information of a list display generator according to the fifth embodiment of the present invention;

FIG. 27 is a view showing the structure of the stored information of a list display generator or a document creator according to the seventh embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that a term "document element" used in the embodiments indicates a document component having an attribute indicating a word, phrase, sentence, paragraph, or the like. The word includes a word with a prefix, suffix, or postpositional particle. The term "document element" indicates a significant information element having an attribute indicating a name, location, telephone number, mail address, or the like. The attribute of the document element includes a kanji character, hiragana character, katakana character, letter, numeral, or symbol. Note that the attribute of the document element is not limited to them as long as it is possible to extract the document element from a document.

First Embodiment

An information processing apparatus 100 according to the first embodiment of the present invention will be described with reference to FIG. 1. The information processing apparatus 100 is an apparatus for controlling selection of a range on a display screen.

Figure 1:
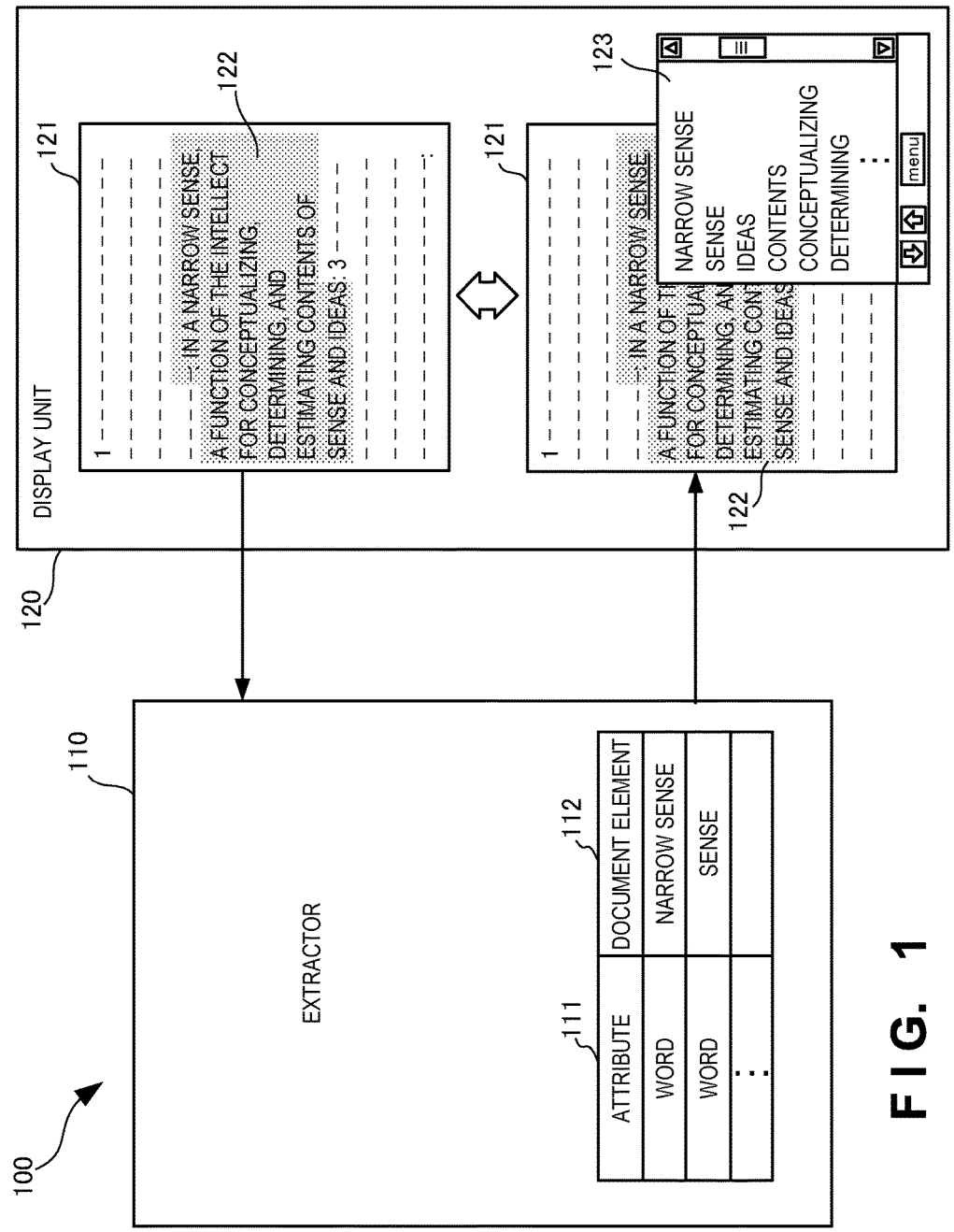
FIG. 1 is a block diagram showing the arrangement of an information processing apparatus according to the first embodiment of the present invention.

As shown in FIG. 1, the information processing apparatus 100 includes an extractor 110 and a display unit 120. The extractor 110 extracts document elements 112 included in a selected range 122 in a document 121 based on attributes 111 of the document elements. The display unit 120 selectably performs list display 123 of extraction results of the extractor 110. The attribute of each document element includes a word, phrase, sentence, or paragraph, a name, location, telephone number, or mail address, or a kanji character, hiragana character, katakana character, letter, numeral, or symbol, and the document elements are extracted based on at least one attribute. Furthermore, a word may include a word with a prefix, suffix, or postpositional particle.

According to this embodiment, since the user can select a desired document element from list display, it is possible to make an actually selected target coincide with a target the user wants to select from a display document.

Second Embodiment

An information processing apparatus according to the second embodiment of the present invention will be described next. The information processing apparatus according to this embodiment extracts pieces of significant information such as words, phrases, sentences, and numbers from a selected range on a document displayed on a display screen, thereby performing list display. The user can select a desired document element from the list display.

<<Overview of Processing>>

Figure 2:
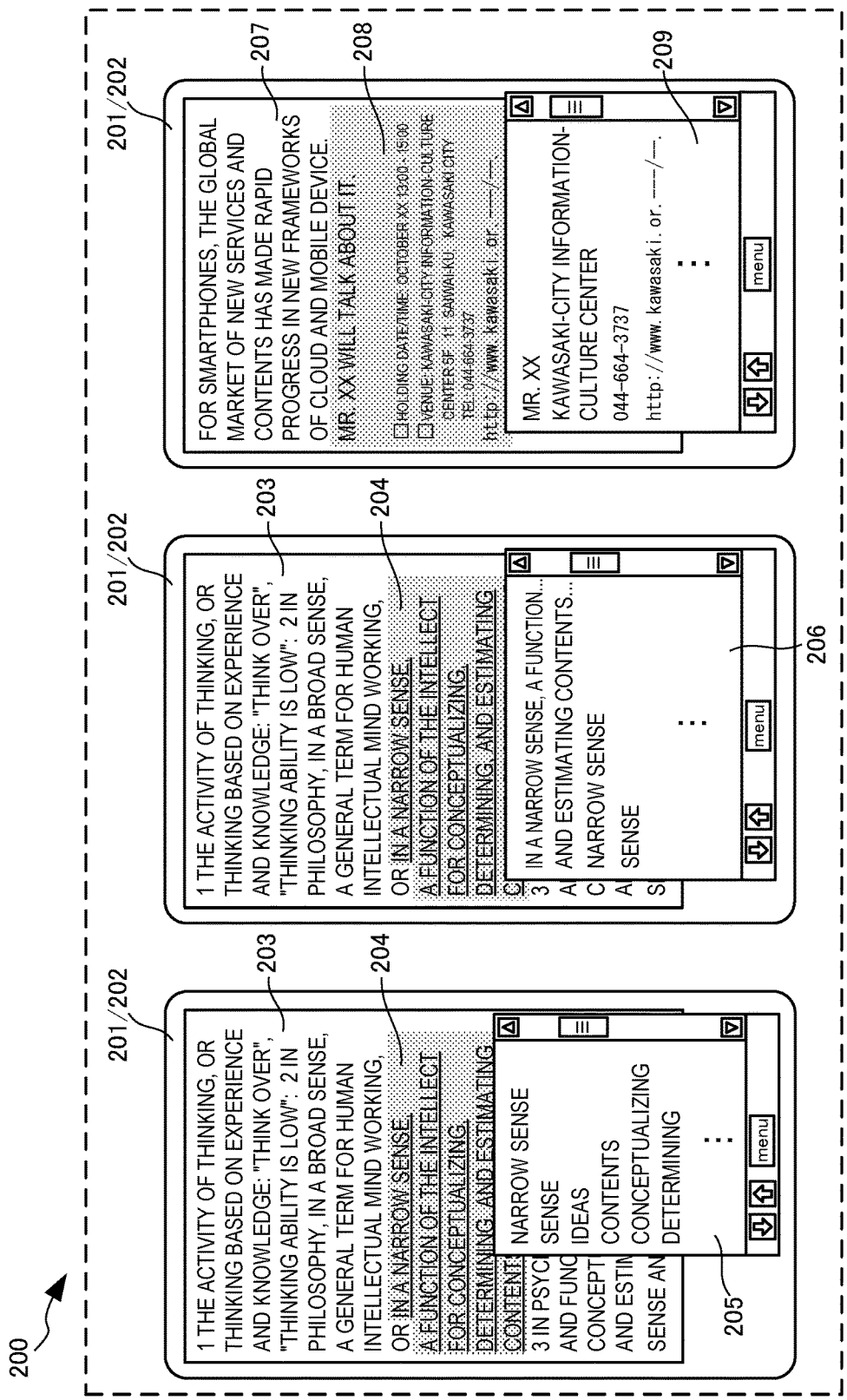
FIG. 2 is a view showing an overview of processing by an information processing apparatus according to the second embodiment of the present invention.

An overview of processing by the information processing apparatus according to this embodiment will be described below with reference to FIGS. 2 and 3. FIG. 2 is a view showing an overview of processing by an information processing apparatus 200 according to this embodiment. FIG. 2 shows an overview of processing common to all embodiments in this specification. FIG. 2 shows some examples of processing according to this embodiment for range selection by the user on a touch panel 201 and a display panel 202 of the information processing apparatus 200.

The left view of FIG. 2 shows a case in which the user designates a selected range 204 in a display document 203. In the left view, words within the selected range 204 are extracted and list display 205 of the extracted words is performed. The central view of FIG. 2 shows a case in which the user designates the selected range 204 in the display document 203. In the central view, words and phrases within selected range 204 are extracted and list display 206 of the extracted words and phrases is performed. In the central view of FIG. 2, the extracted phrases have higher priority levels than the extracted words. The right view of FIG. 2 shows a case in which the user designates a selected range 208 in a display document 207. In the right view, a name, facility name, telephone number, and homepage address within the selected range 208 are extracted and list display 209 is performed.

When the user selects and designates a desired document element from the list display 205, 206, or 209, he/she can reliably select a target (document element) which cannot be narrowed down by designation of the selected range 204 or 208 by the user.

(List Display of Embodiment)

Figure 3:
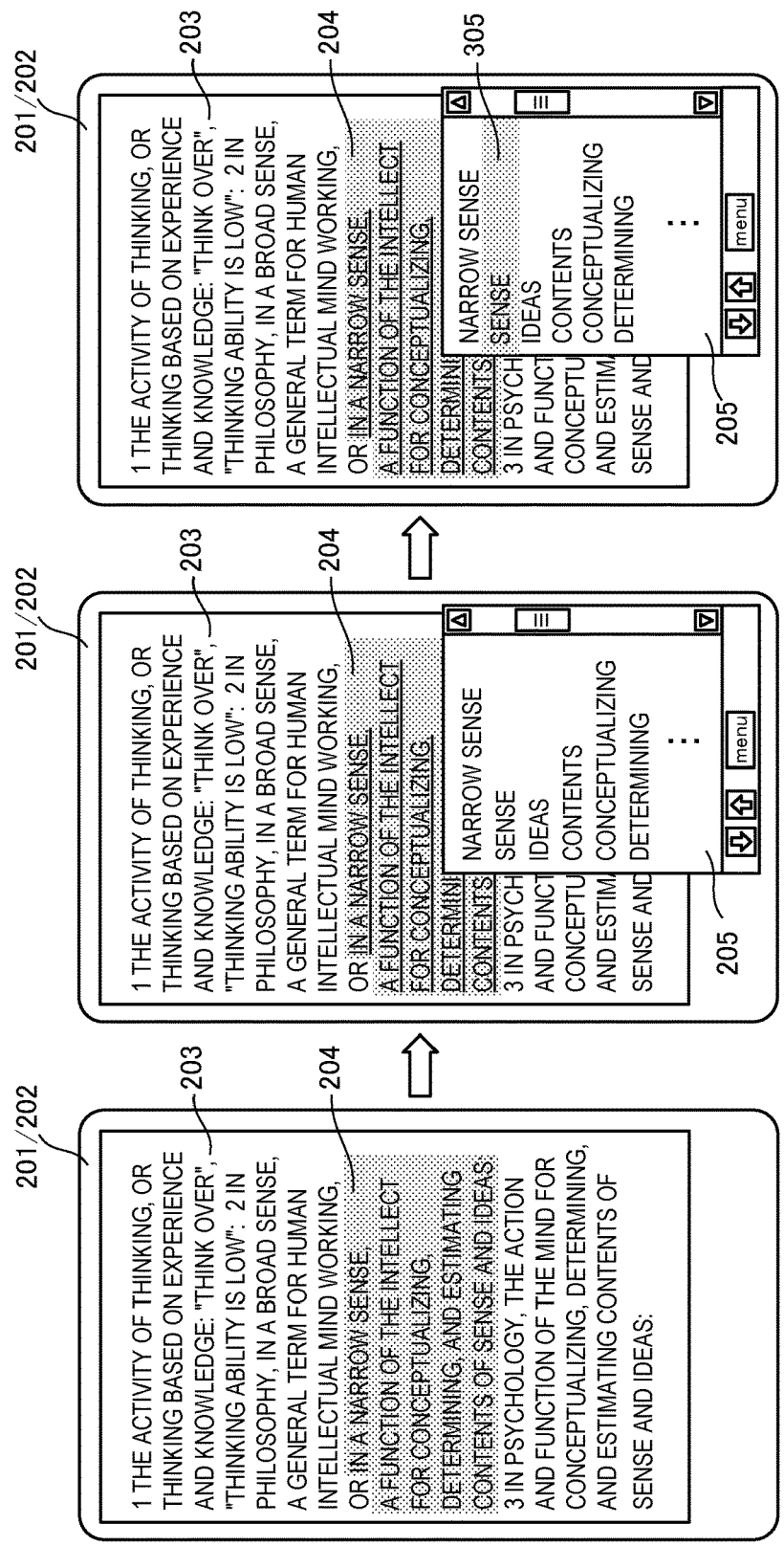
FIG. 3 is a view for explaining list display of selection candidates in the information processing apparatus according to the second embodiment of the present invention.

FIG. 3 is a view for explaining list display of selection candidates in the information processing apparatus 200 according to this embodiment. An example of extracting document elements each having an attribute indicating a word from a selected range, and performing list display will be described with reference to FIG. 3. However, the same applies to extraction and list display of document elements having another attribute or a plurality of attributes. Note that in FIG. 3, the same reference numerals denote the same components as in FIG. 2.

The left view of FIG. 3 shows a state in which the selected range 204 selected by the user from the display document 203 has been designated. In this embodiment, designation of the selected range 204 is not limited. For example, any operation for range designation, such as a touch on the touch panel 201 by the user, a stroke for surrounding the selected range 204, and an operation by a keyboard or pointing device, may be included.

The central view of FIG. 3 shows a state in which in accordance with designation of the selected range 204, document elements each having a predetermined attribute within the selected range 204 have been extracted and the list display 205 has been performed. In the central view of FIG. 3, document elements each having the attribute "word" within the selected range 204 are extracted, and the list display 205 is performed in the order of extraction from the top of the selected range 204.

The right view of FIG. 3 shows a state in which the user has selected "sense" 305 on the second line from the list display 205. The "sense" 305 is a word desired by the user as a selection target. Even though the "sense" cannot be accurately selected and designated from the display document 203, the list display according to this embodiment allows the user to do this. For example, the selected "sense" 305 is stored in a selected element database (to be referred to as a DB hereinafter), and used for paste processing for document creation or the like in subsequent processing.

<<Information Processing Apparatus>>

Figure 4A:
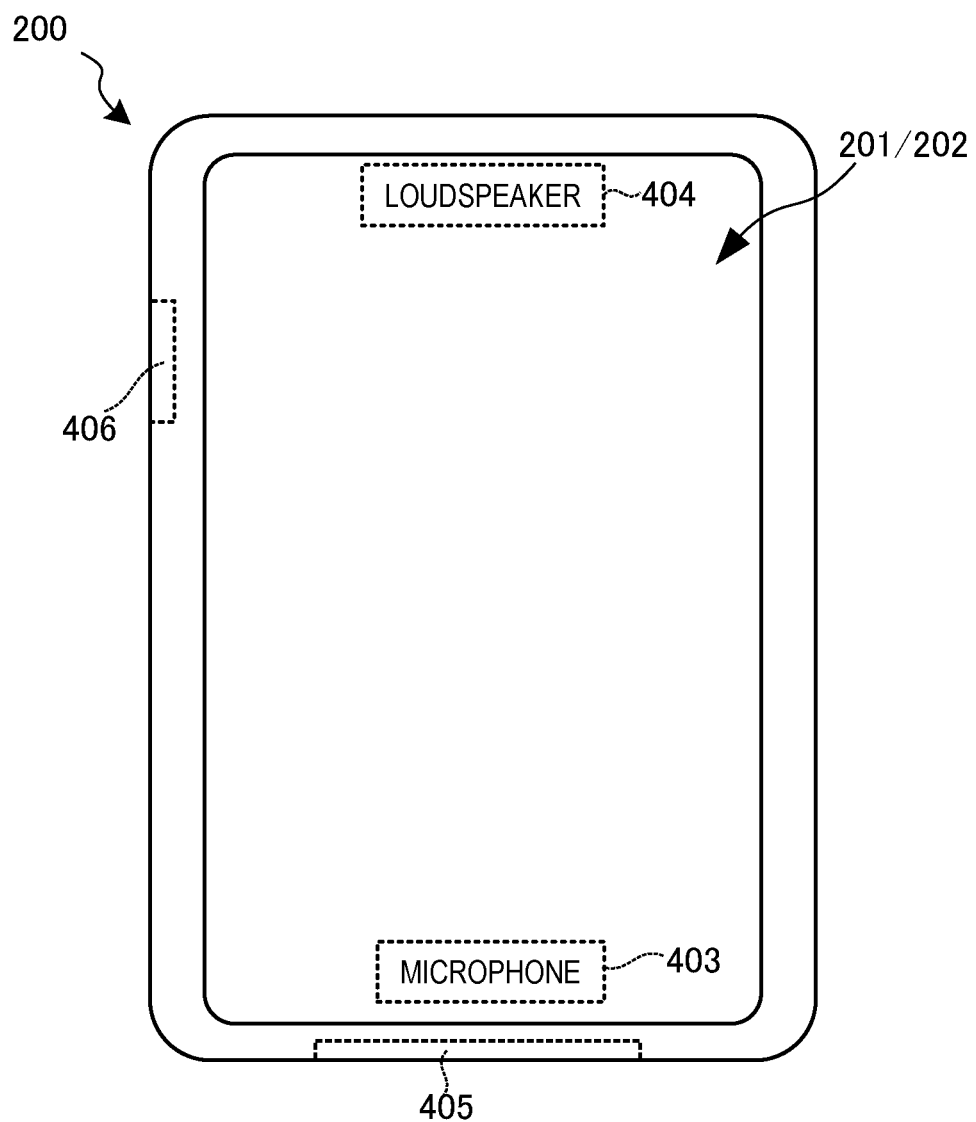
FIG. 4A is a view showing the outer appearance of the information processing apparatus according to the second embodiment of the present invention.

FIG. 4A is a view showing the outer appearance of the information processing apparatus 200 according to this embodiment. Note that FIG. 4A shows a portable terminal using a touch panel, such as a smartphone or tablet. However, the information processing apparatus according to this embodiment is not limited to the smartphone or tablet.

In the information processing apparatus 200, the touch panel 201 and the display panel 202 function as an operation unit and a display unit, respectively. The information processing apparatus 200 includes a microphone 403 and a loudspeaker 404 as a voice input/output function. The information processing apparatus 200 also includes a switch group 405 including a power switch. Furthermore, the information processing apparatus 200 includes an external interface 406 used for external input/output device connection and communication connection.

(Functional Arrangement of Information Processing Apparatus)

Figure 4B:
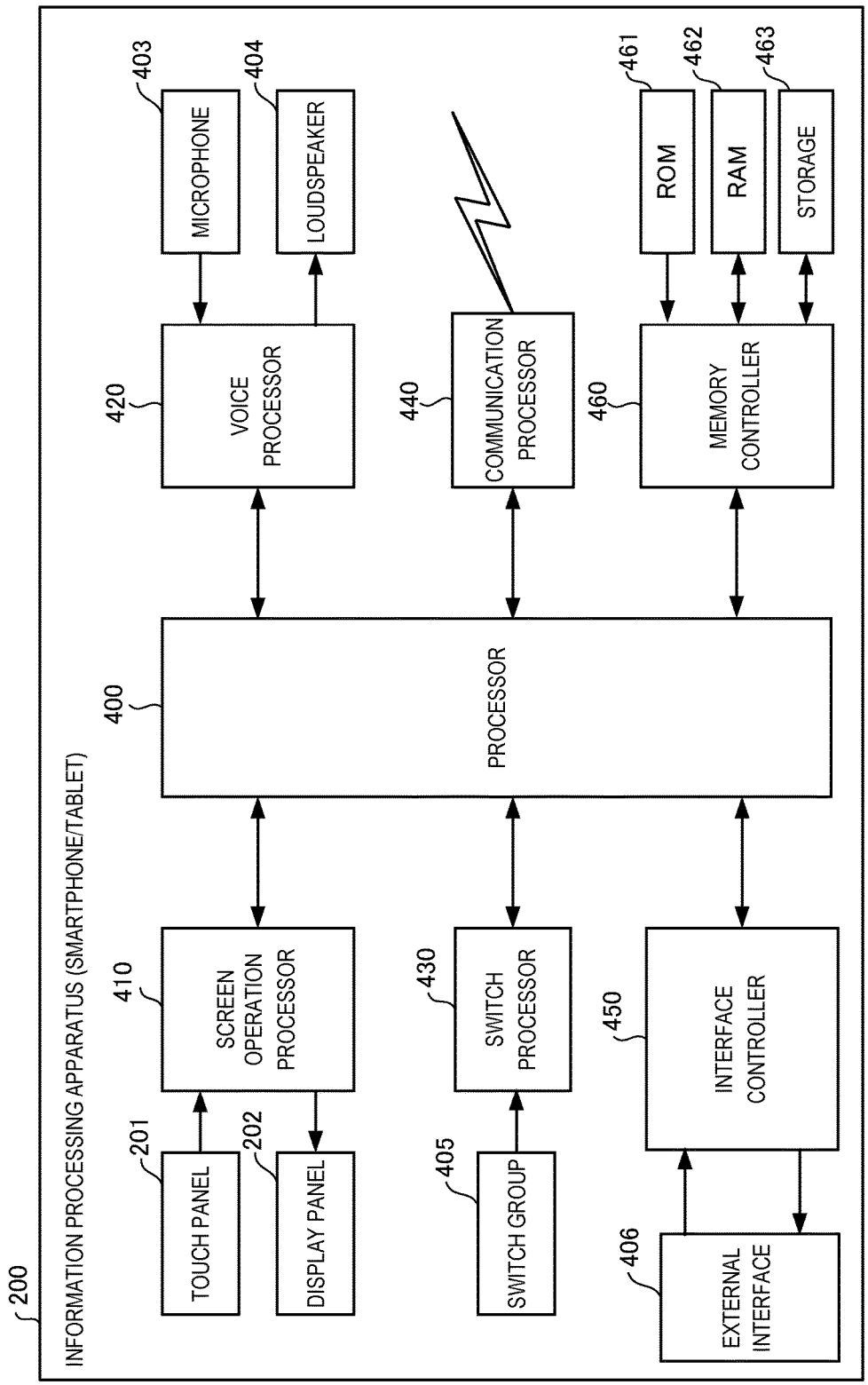
FIG. 4B is a block diagram showing the arrangement of the information processing apparatus according to the second embodiment of the present invention.

FIG. 4B is a block diagram showing the arrangement of the information processing apparatus 200 according to this embodiment. Note that FIG. 4B shows the basic arrangement of the portable terminal using the touch panel, such as a smartphone or tablet. The present invention, however, is not limited to this. Each component shown in FIG. 4B may be implemented by a single hardware component, software by including a proprietary processor to execute a program, or firmware by combining hardware and software. Each component shown in FIG. 4B is separated from other components to independently implement its function. In fact, however, each component is implemented by a combination of multilayer controls from bottom layer control by basic hardware and OS (Operating System) and input/output control to top layer control by an application program.

A processor 400 includes at least one CPU (Central Processing Unit), and controls the overall information processing apparatus 200. Note that the processor 400 desirably incorporates a unique memory. A screen operation processor 410 is a component for performing processing according to this embodiment. The screen operation processor 410 accepts a user operation input from the touch panel 201, changes a display screen in correspondence with the user operation input, and displays the screen on the display panel 202. Note that the screen operation processor 410 may be implemented by executing an associated program by the processor 400 but an independent screen operation processor is desirably provided. A voice processor 420 processes a voice input from the microphone 403 to, for example, transmit the voice input via a communication processor 440 or send a user voice instruction changed to a user operation input from the touch panel 201. The voice processor 420 generates a notification/warning to the user, a video reproduction voice, or the like, and outputs a voice from the loudspeaker. The voice processor 420 is also desirably provided with a voice processing processor independent of the processor 400.

A switch processor 430 executes processing based on a switch input from the switch group 405. The communication processor 440 transmits/receives data via a network. An interface controller 450 controls data input/output to/from an input/output device connected via the external interface 406. The communication processor 440 is also desirably provided with a voice processing processor independent of the processor 400. For example, a memory controller 460 controls exchange of data and programs between the processor 400 and a ROM (Read Only Memory) 461 which is formed by a flash memory and the like, RAM (Random Access Memory) 462, and storage 463. The memory controller 460 is also desirably provided with a voice processing processor independent of the processor 400.

The screen operation processor 410 according to this embodiment will be described in more detail below.

(Screen Operation Processor)

Figure 5:
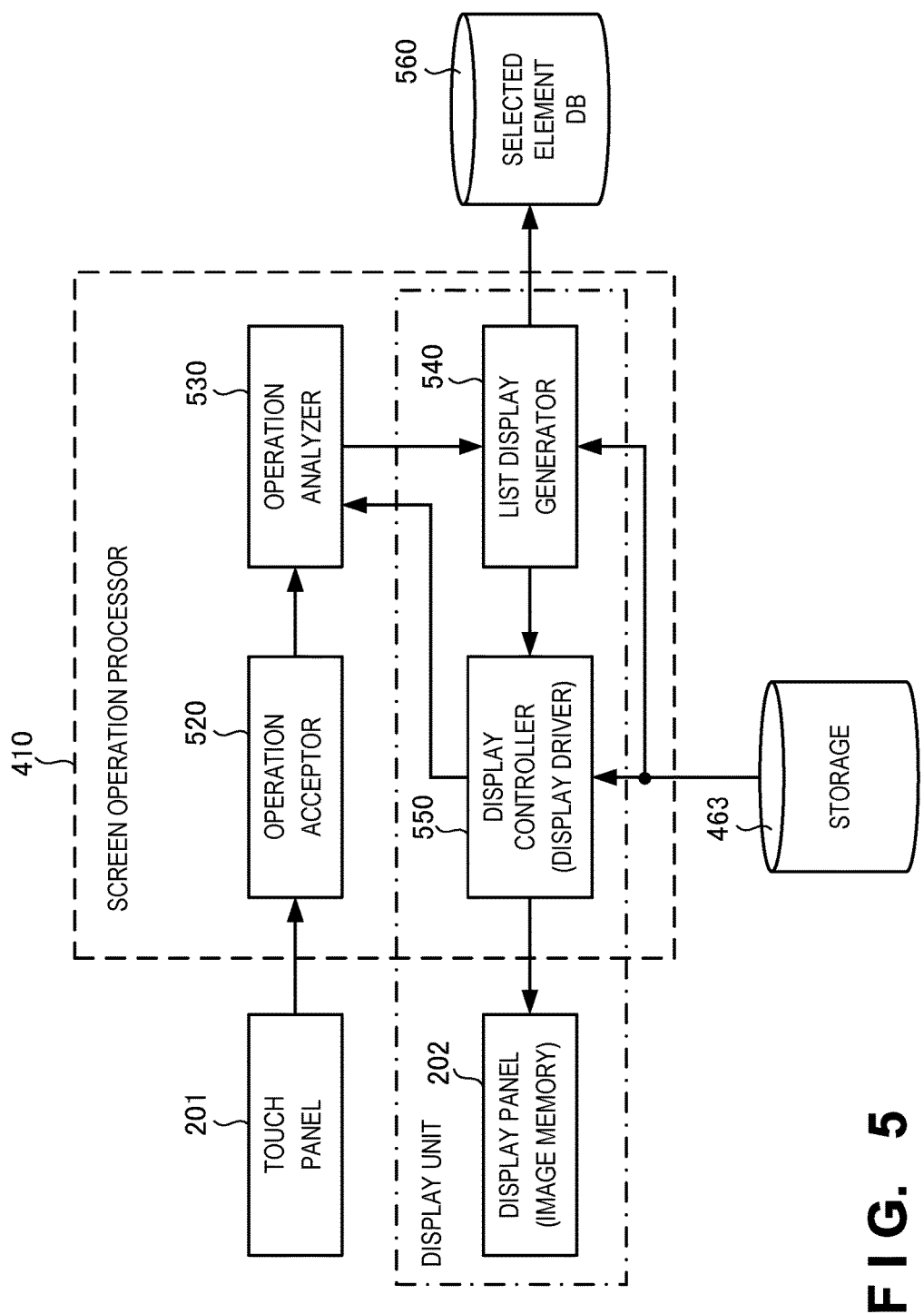
FIG. 5 is a block diagram showing the functional arrangement of a screen operation processor according to the second embodiment of the present invention.

FIG. 5 is a block diagram showing the functional arrangement of the screen operation processor 410 according to this embodiment.

The screen operation processor 410 includes an operation acceptor 520, an operation analyzer 530, a list display generator 540, and a display controller 550. The operation acceptor 520 accepts a user operation from the touch panel 201, and acquires a touch position, an operation, and the like. The operation analyzer 530 analyzes operation contents in consideration of information of the display screen based on the user operation and position accepted by the operation acceptor 520. In this embodiment, the operation analyzer 530 especially detects a range selected by the user from the display screen. Furthermore, the operation analyzer 530 performs position detection designated by the user to select a document element of list display. The list display generator 540 extracts document elements each having a predetermined attribute from the selected range detected by the operation analyzer 530, and generates list display of the extracted document elements. The list display generator 540 selects a document element designated by the user from the list display based on the position, in the list, detected by the operation analyzer 530. The display controller 550 includes a display driver, and reads out display information in the storage 463 and displays the information on the display panel 202 while displaying, on the display panel 202, the list generated by the list display generator 540. The screen of the display panel 202 is controlled by changing an image memory so as to implement, on the display screen, display of the selected range by an operation instructed by the user or the like. The list display generator 540, display controller 550, and display panel 202 may be integrated as a display unit.

Note that the functional components shown in FIG. 5 may be implemented by the processing of the processor of the screen operation processor 410, or some functional components may be processed by a proprietary processor to increase the processing speed. Each functional component shown in FIG. 5 is limited to the operation of the screen operation processor 410 but may exchange data with other components of the information processing apparatus 200 shown in FIG. 4B.

(Operation Acceptor)

Figure 6:
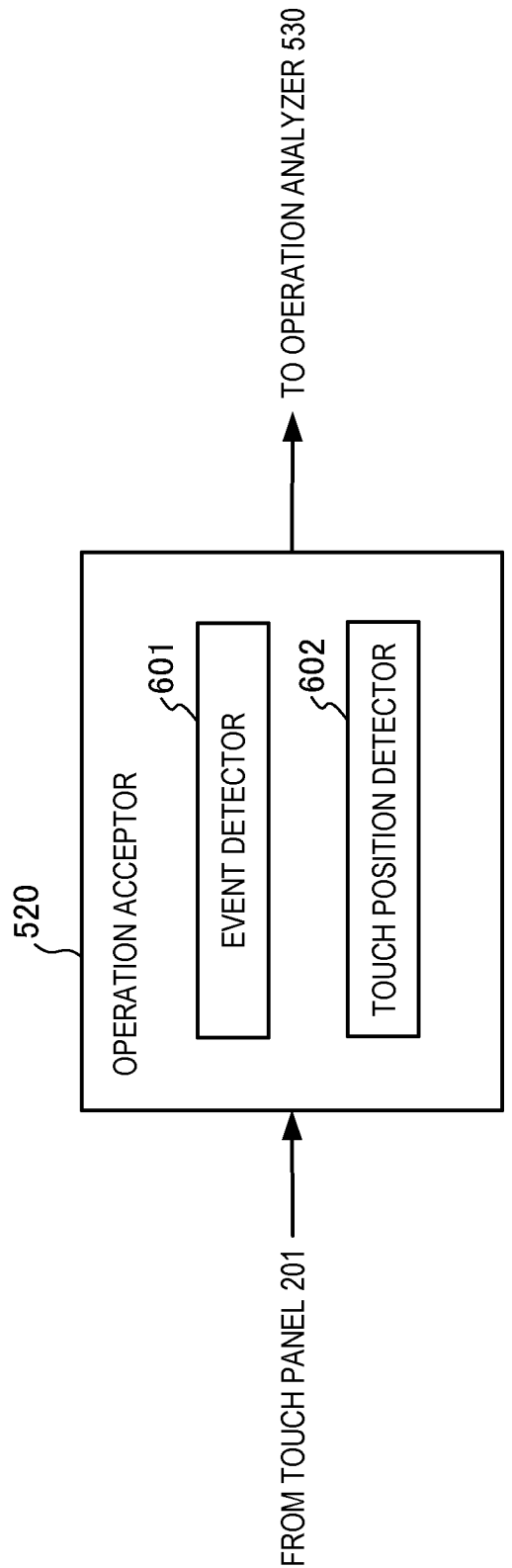
FIG. 6 is a block diagram showing the functional arrangement of an operation acceptor according to the second embodiment of the present invention.

FIG. 6 is a block diagram showing the functional arrangement of the operation acceptor 520 according to this embodiment. The operation acceptor 520 accepts a user operation from the touch panel 201, and acquires a touch position and an operation.

The operation acceptor 520 includes an event detector 601 and a touch position detector 602. The event detector 601 detects the start of some operation from the user on the touch panel 201, and starts accepting operation data. The touch position detector 602 detects position coordinates on the touch panel 201 touched by a user's finger.

(Operation Analyzer)

Figure 7:
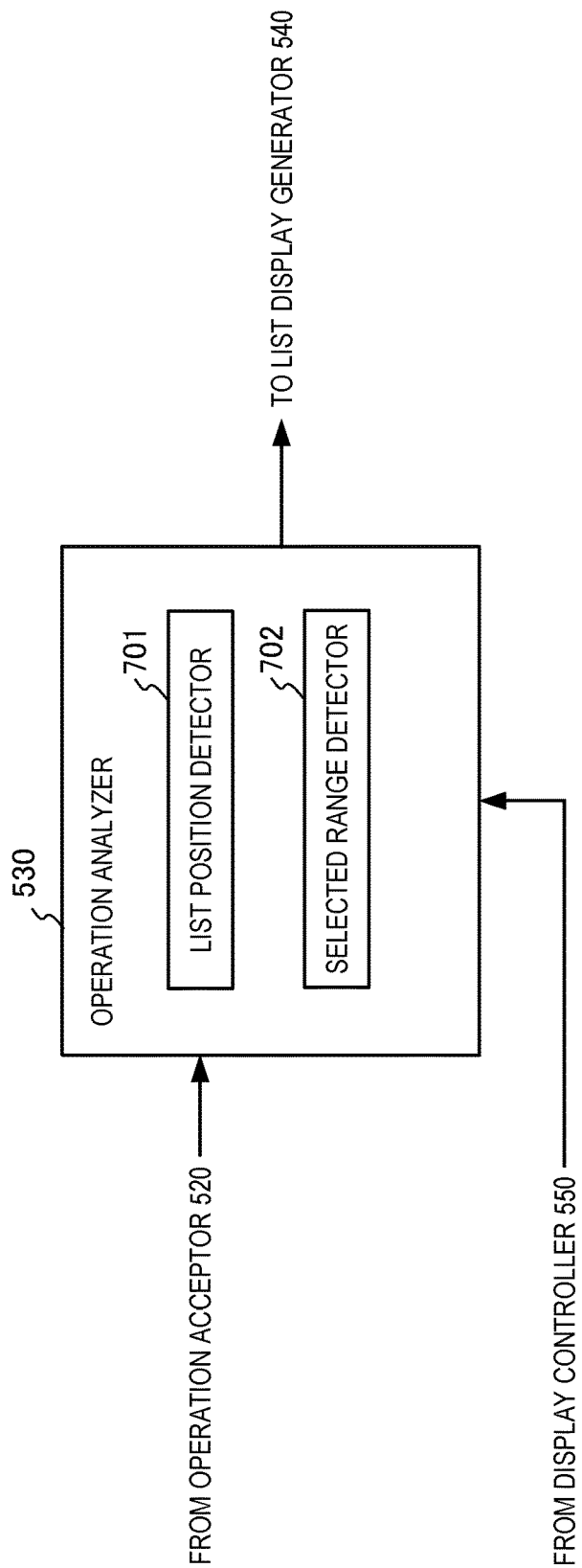
FIG. 7 is a block diagram showing the functional arrangement of an operation analyzer according to the second embodiment of the present invention.

FIG. 7 is a block diagram showing the functional arrangement of the operation analyzer 530 according to this embodiment. The operation analyzer 530 analyzes operation contents in consideration of the information of the display screen based on the user operation and position accepted by the operation acceptor 520.

The operation analyzer 530 includes a list position detector 701 and a selected range detector 702. Based on the touch position of the user from the operation acceptor 520, the list position detector 701 detects a position selected by the user from the list in which the plurality of document elements are displayed. Based on the touch position of the user from the operation acceptor 520, the selected range detector 702 detects the range selected by the user from the display document.

(List Display Generator)

Figure 8A:
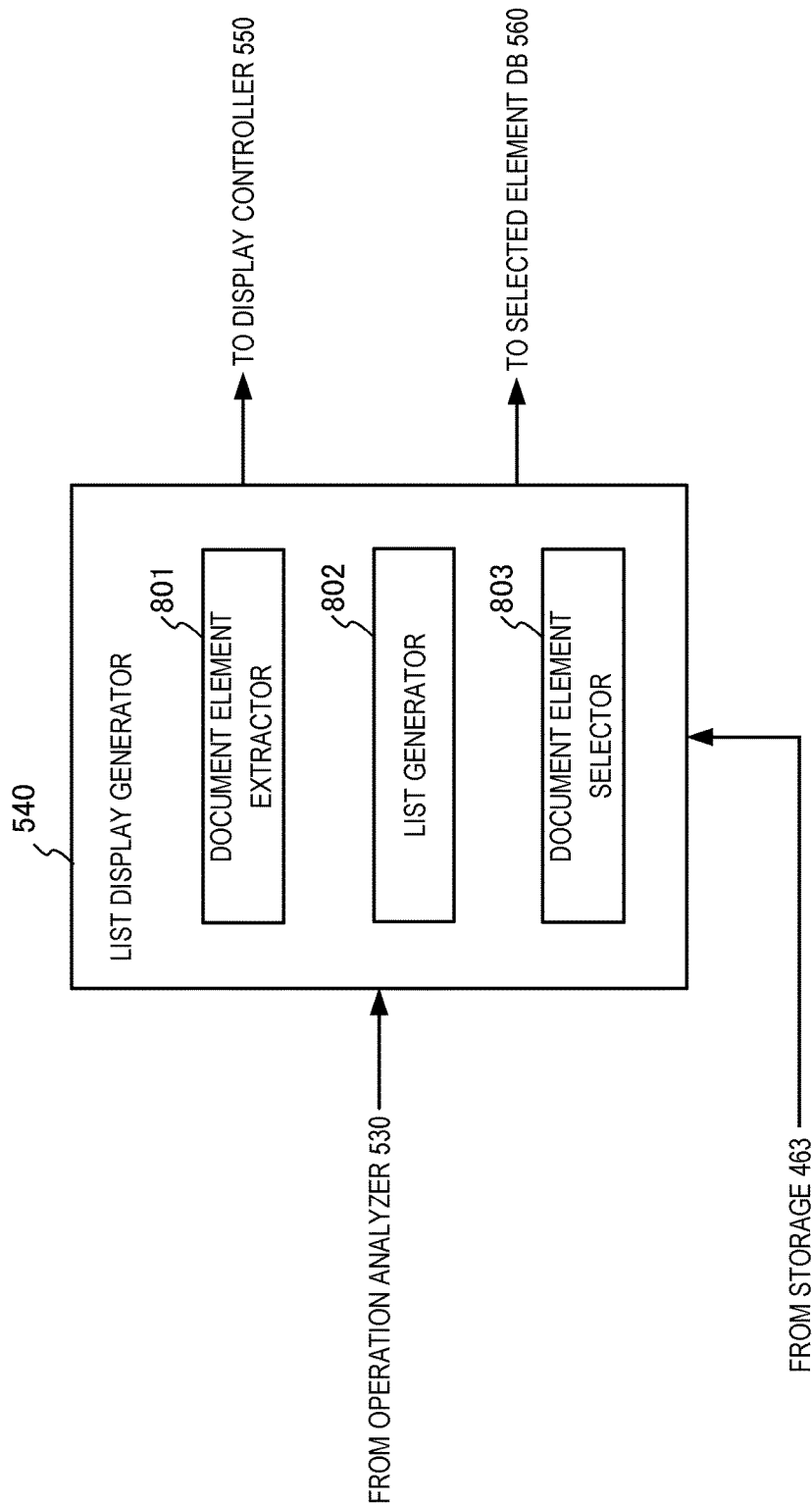
FIG. 8A is a block diagram showing the functional arrangement of a list display generator according to the second embodiment of the present invention.

FIG. 8A is a block diagram showing the functional arrangement of the list display generator 540 according to this embodiment. The list display generator 540 generates list display by extracting document elements each having a predetermined attribute from the selected range, and selects a document element designated by the user from the list display based on a position in the list.

The list display generator 540 includes a document element extractor 801, a list generator 802, and a document element selector 803. The document element extractor 801 extracts document elements each having the predetermined attribute from the selected range of the display document, and stores them. The list generator 802 selectably makes, in a predetermined order, a list of the document elements extracted by the document element extractor 801, and generates data to be displayed at a predetermined position. The document element selector 803 selects a desired document element from the list display based on the list position designated by the user from the operation analyzer 530. The document element selector 803 registers, in a selected element DB 560, the document element selected by the user. The registered document element is used for, for example, a subsequent paste operation or the like.

Figure 8B:
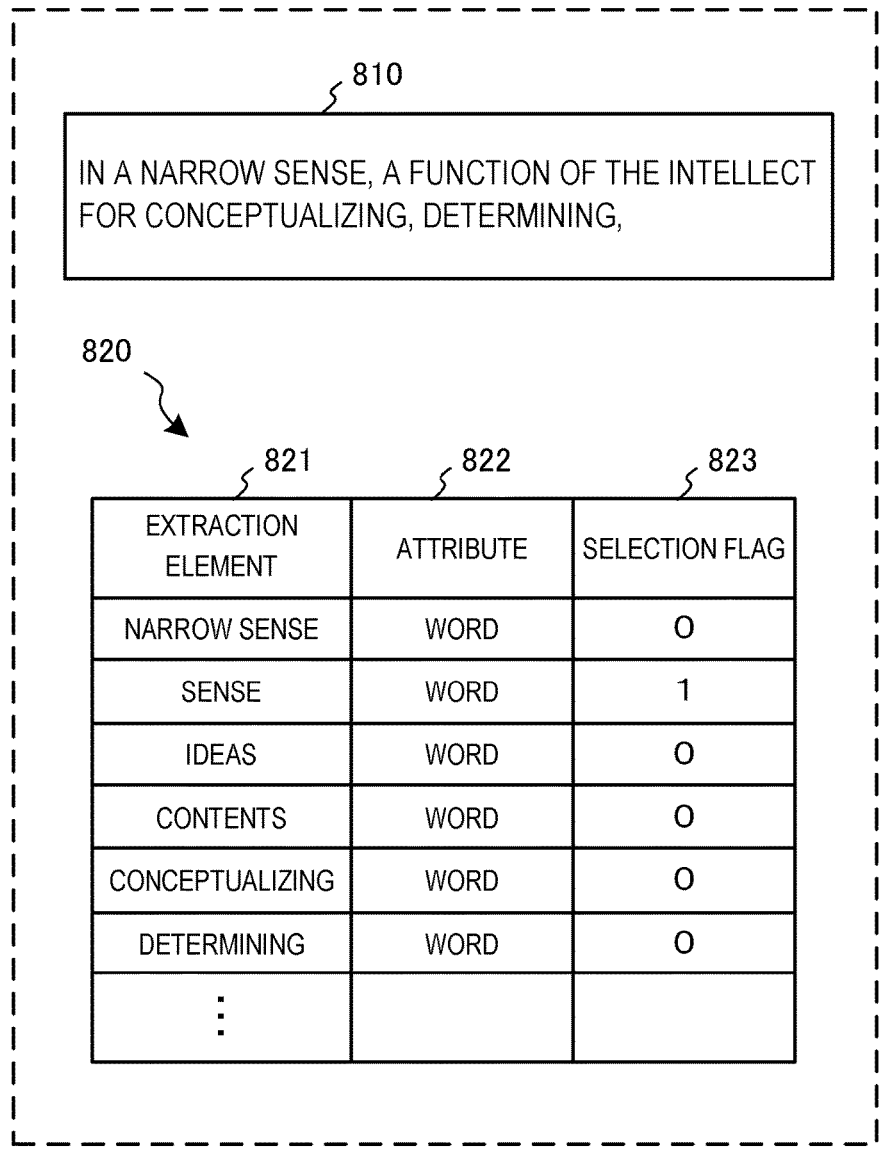
FIG. 8B is a view showing the structure of the stored information of the list display generator according to the second embodiment of the present invention.

FIG. 8B is a view showing the structure of the stored information of the list display generator 540 according to this embodiment. The storage unit of the list display generator 540 stores information to be used by the document element extractor 801, list generator 802, and document element selector 803.

A document storage unit 810 of the selected range of the document stores "in a narrow sense, . . . determining," within the selected range in this example. Furthermore, a list storage unit 820 stores extraction elements 821 extracted by the document element extractor 801 from the document in the document storage unit 810 based on attributes, attributes 822 of the extraction elements 821, and selection flags 823 each indicating selection by the document element selector 803. For example, "1" of the selection flag 823 indicates that the corresponding extraction element has been selected.

(Display Controller)

Figure 9:
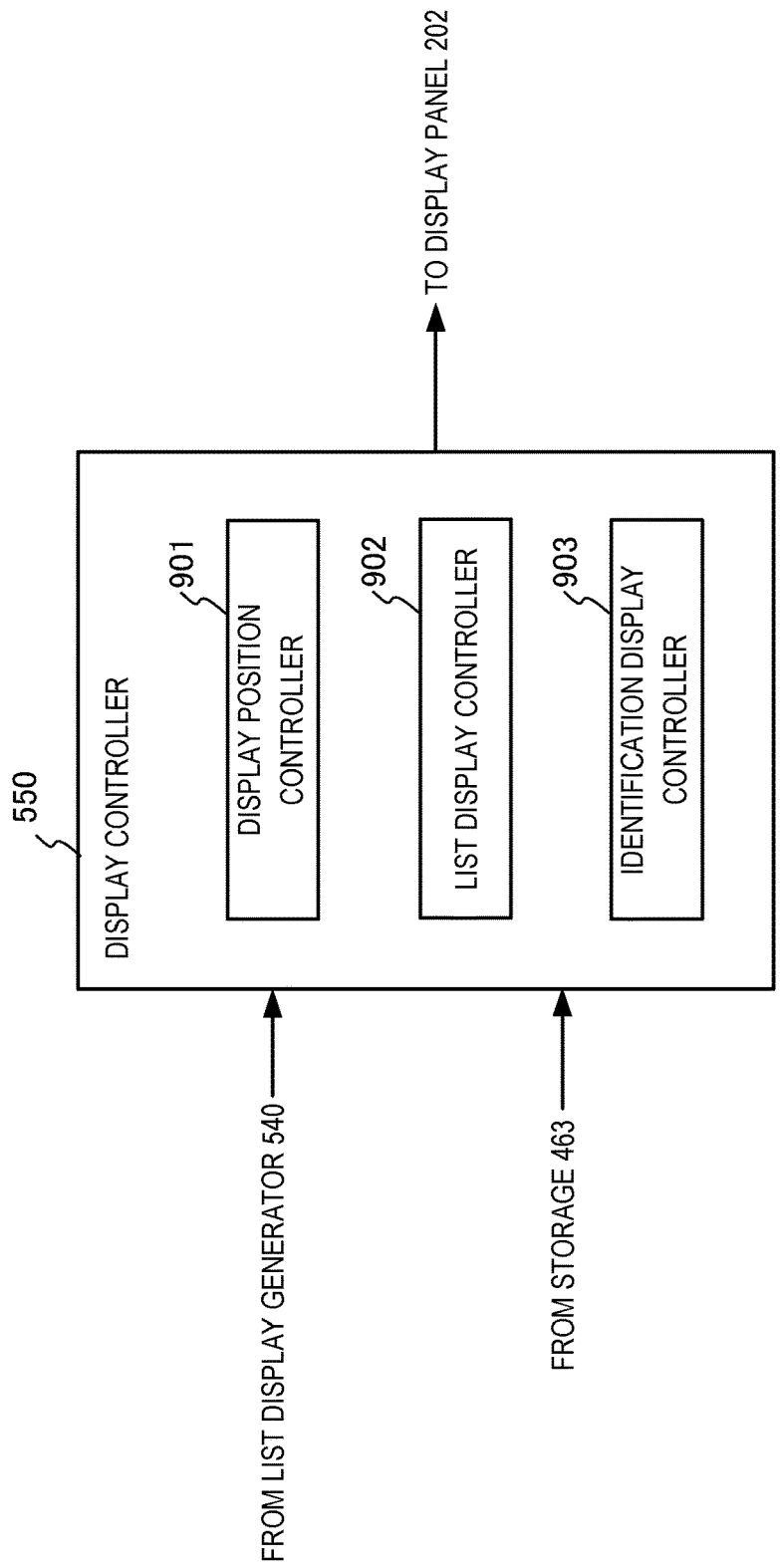
FIG. 9 is a block diagram showing the functional arrangement of a display controller according to the second embodiment of the present invention.

FIG. 9 is a block diagram showing the functional arrangement of the display controller 550 according to this embodiment. The display controller 550 includes a display driver, and reads out display information in the storage 463 to display it on the display panel 202 while displaying, on the display panel 202, the list generated by the list display generator 540.

The display controller 550 includes a display position controller 901, a list display controller 902, and an identification display controller 903. The display position controller 901 controls a position of the display information read out from the storage 463 to be displayed. In this embodiment, the display position controller 901 controls the display position of the document. The list display controller 902 controls to display the list of the document elements generated by the list generator 802 at a predetermined position on the display panel 202. The identification display controller 903 controls to identifiably display the selected range of the document and the document element selected from the list display on the display screen.

<<Procedure of Screen Operation Processing>>

FIG. 10 is a flowchart illustrating the procedure of screen operation processing by the information processing apparatus 200 according to this embodiment. This flowchart implements the respective functional components of the screen operation processor 410 when executed by the processor 400 or the CPU of the screen operation processor 410. A case in which the CPU of the screen operation processor 410 executes the flowchart will be described.

In step S1001, the screen operation processor 410 displays a predetermined portion of a document designated, by the user, to be displayed. For example, as shown in FIG. 3, a page of "thought" of a dictionary is displayed. In step S1003, the screen operation processor 410 selects a range based on a selection operation in the document by the user using the touch panel 201 and the like, and identifiably displays the range. When the range in the display document is selected, the screen operation processor 410 executes, in step S1005, element extraction processing of extracting document elements within the selected range based on a predetermined attribute. In step S1007, the screen operation processor 410 executes list display processing of performing list display of the extracted document elements in a predetermined order.

In step S1009, the screen operation processor 410 waits for designation of a desired document element by the user in the list display. When the user designates a document element, the screen operation processor 410 processes the selected document element in step S1011. The processing of the selected document element may include, for example, paste processing in a copy mode.

(Element Extraction Processing within Selected Range)

Figure 11A:
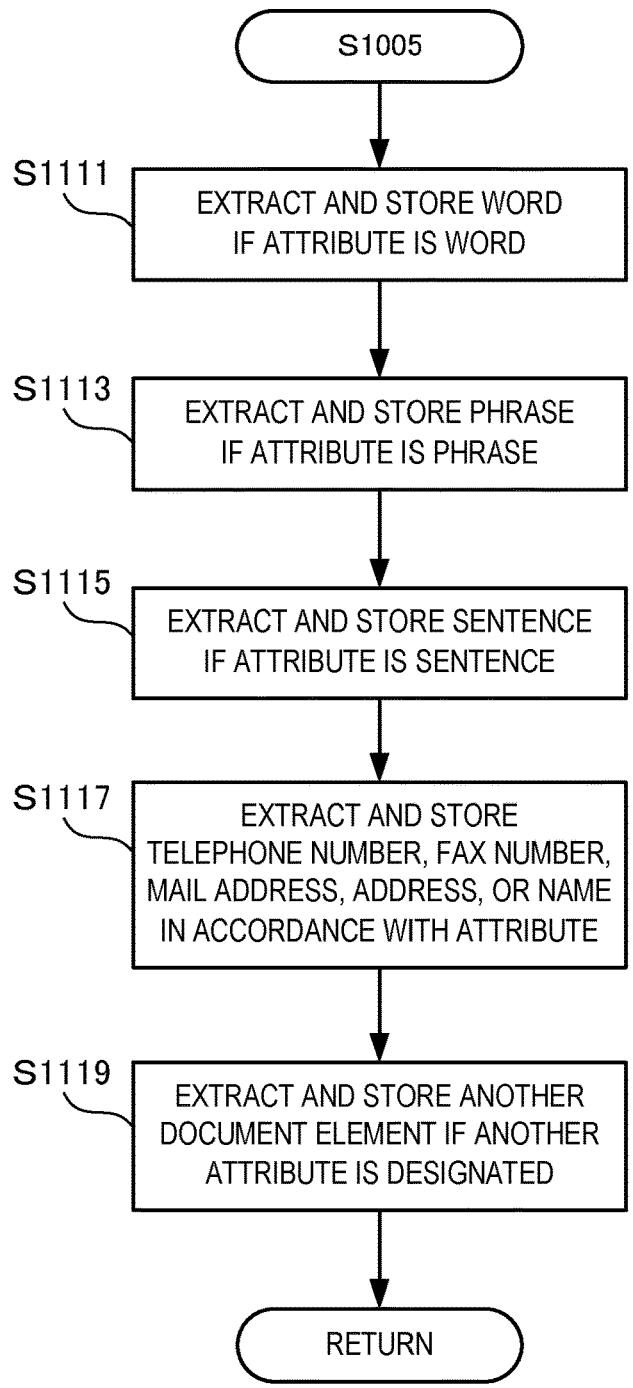
FIG. 11A is a flowchart illustrating the procedure of element extraction processing within a selected range according to the second embodiment of the present invention.

FIG. 11A is a flowchart illustrating the procedure of the element extraction processing (S1005) within the selected range according to this embodiment.

In step S1111, if the attribute is "word", the screen operation processor 410 extracts a word from the selected range, and stores it in the list storage unit 820. In step S1113, if the attribute is "phrase", the screen operation processor 410 extracts a phrase from the selected range, and stores it in the list storage unit 820. In step S1115, if the attribute is "sentence", the screen operation processor 410 extracts a sentence from the selected range, and stores it in the list storage unit 820. In step S1117, in accordance with an attribute such as "telephone number", the screen operation processor 410 extracts a document element having the attribute from the selected range, and stores it in the list storage unit 820. In step S1119, if another attribute is designated, the screen operation processor 410 extracts a document element having the attribute from the selected range, and stores it in the list storage unit 820.

(List Display Processing)

Figure 11B:
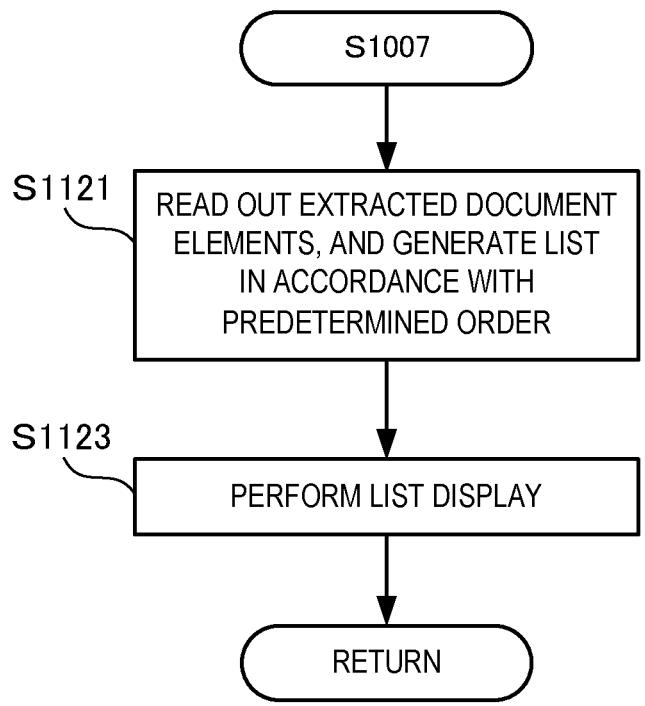
FIG. 11B is a flowchart illustrating the procedure of list display processing according to the second embodiment of the present invention.

FIG. 11B is a flowchart illustrating the procedure of the list display processing (step S1007) according to this embodiment.

In step S1121, the screen operation processor 410 reads out the document elements extracted from the selected range with reference to the list storage unit 820, and generates a list in accordance with the predetermined order. In this embodiment, as an example, the document elements sequentially extracted from the start point of the selected range are listed. In step S1123, the screen operation processor 410 displays the generated list at a predetermined position on the display screen.

According to this embodiment, since the user can select a desired document element from the list display by extracting document elements each having the predetermined attribute from the selected document and performing list display, it is possible to make an actually selected target coincide with a target the user wants to select from the display document.

Third Embodiment

An information processing apparatus according to the third embodiment of the present invention will be described next. The information processing apparatus according to this embodiment is different from that according to the second embodiment in that list display of document elements extracted based on priority levels set by the user or application is performed. The remaining components and operations are the same as those in the second embodiment. Hence, the same reference numerals denote the same components and operations, and a detailed description thereof will be omitted.

(List Display of Embodiment)

FIG. 12 is a view for explaining list display of selection candidates in the information processing apparatus according to this embodiment. An example of extracting document elements each having an attribute indicating a word or phrase from a selected range and performing list display will be described with reference to FIG. 12. However, the same applies to extraction and list display of document elements having another attribute or a plurality of attributes. Note that in FIG. 12, the same reference numerals denote the same components as in FIGS. 2 and 3.

The upper view of FIG. 12 shows list displays 205 and 1205 between which words extracted from a selected range 204 are different. In the list display 205, words sequentially extracted from the beginning of the selected range 204 are listed, similarly to FIG. 3 in the second embodiment. On the other hand, in the list display 1205, words sequentially extracted from the end of the selected range 204 are listed contrary to FIG. 3 in the second embodiment. That is, between the list displays 205 and 1205, the extracted words are the same but the display priority levels are different. Although the upper view of FIG. 12 shows the opposite cases, the present invention is not limited to this. The list order may be changed by setting by the user or application.

The lower view of FIG. 12 shows list displays 206 and 1206 between which words and phrases extracted from the selected range 204 are different. In the list display 206, document elements extracted in the order from phrases to words are listed, similarly to the central view of FIG. 2. On the other hand, in the list display 1206, document elements extracted in the order from words to phrases are listed contrary to the central view of FIG. 2. That is, between the list displays 206 and 1206, the extracted words and phrases are the same but display priority levels are different. Although the lower view of FIG. 12 shows the opposite cases, the present invention is not limited to this. The list order may be changed to a more complicated list order by setting by the user or application.

(List Display Generator)

Figure 13:
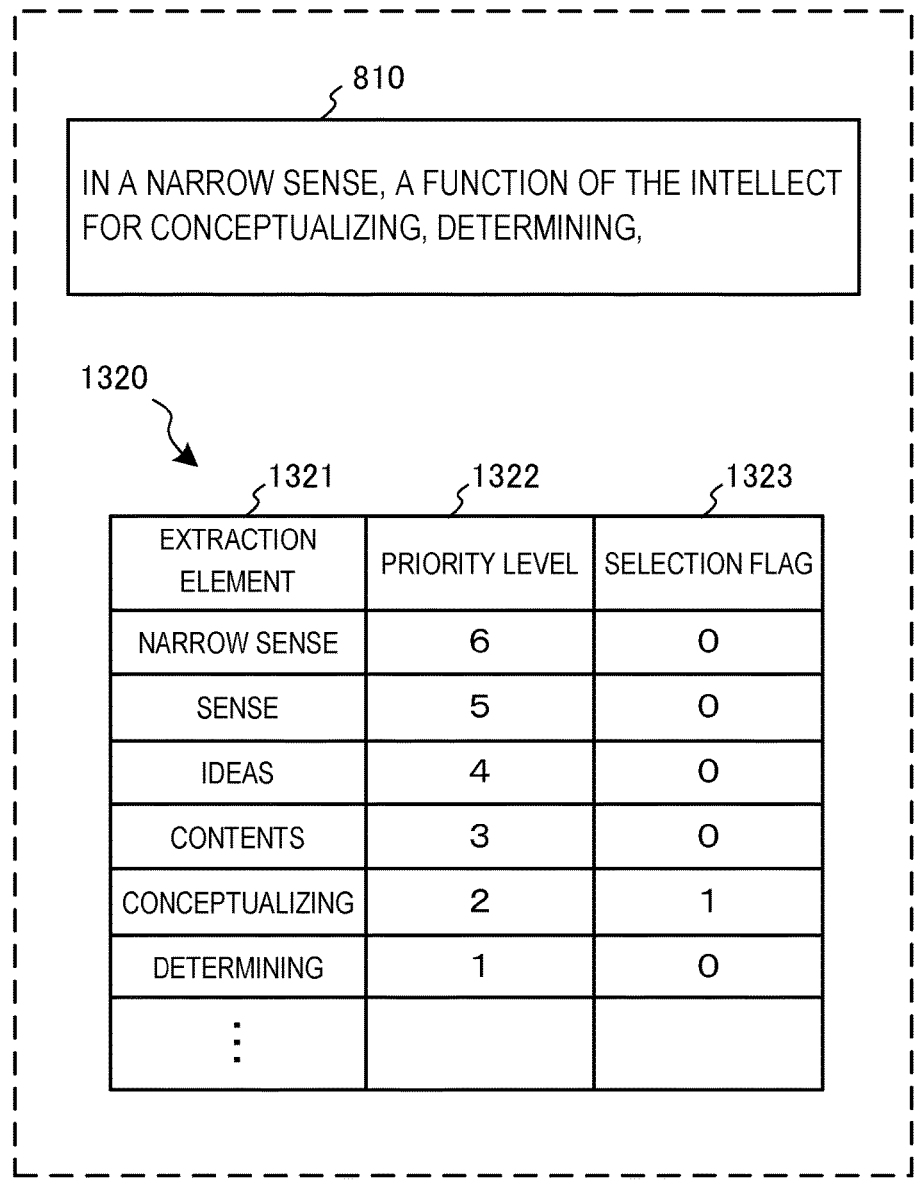
FIG. 13 is a view showing the structure of the stored information of a list display generator according to the third embodiment of the present invention.

FIG. 13 is a view showing the structure of the stored information of a list display generator 540 according to this embodiment. The storage unit of the list display generator 540 stores information to be used by a document element extractor 801, a list generator 802, and a document element selector 803. Note that in FIG. 13, the same reference numerals as in FIG. 8B denote the same components and a description thereof will be omitted.

A list storage unit 1320 shown in FIG. 13 is an arrangement example when words sequentially extracted from the end of the selected range 204 shown in the upper view of FIG. 12 are listed. The list storage unit 1320 stores extraction elements 1321 extracted by a document element extractor 801 from a document in a document storage unit 810 based on attributes, priority levels 1322 for listing the extraction elements 1321, and selection flags 1323 each indicating selection by the document element selector 803. For example, "1" of the selection flag 1323 indicates that the corresponding extraction element has been selected. Although not shown in FIG. 13, an attribute may be stored in correspondence with each extraction element 1321, similarly to FIG. 8B.

(List Display Processing)

Figure 14:
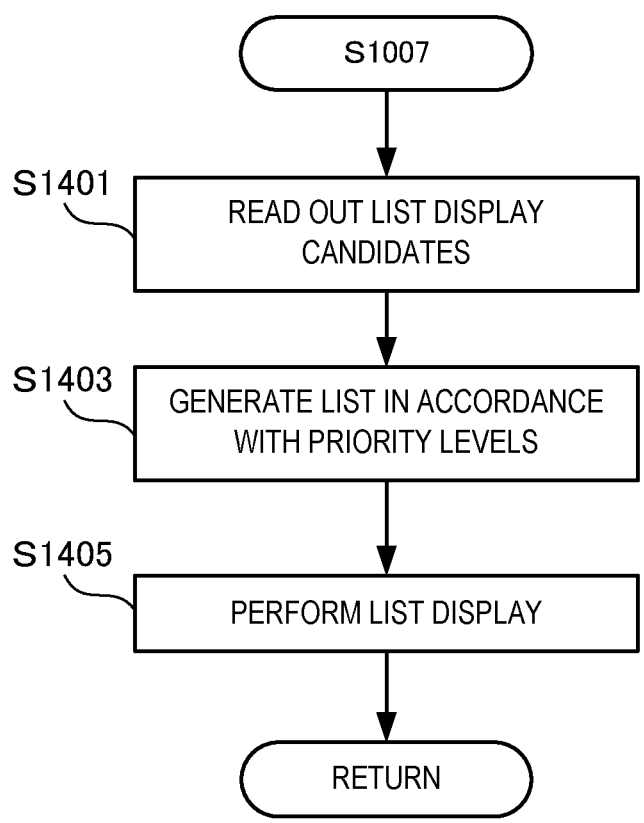
FIG. 14 is a flowchart illustrating the procedure of list display processing according to the third embodiment of the present invention.

FIG. 14 is a flowchart illustrating the procedure of list display processing (S1007) according to this embodiment.

In step S1401, a screen operation processor 410 reads out, as list display candidates, the extraction elements 1321 extracted from the document within the selected range. In step S1403, the screen operation processor 410 generates a list by sorting the extraction elements 1321 in accordance with the priority levels 1322. In step S1405, the screen operation processor 410 performs list display of the extraction elements 1321 listed based on the priority levels 1322.

According to this embodiment, it is possible to display a list so that the user can readily select a desired document element from list display.

Fourth Embodiment

An information processing apparatus according to the fourth embodiment of the present invention will be described next. The information processing apparatus according to this embodiment is different from that according to the third embodiment in that list display is performed in the order from the central position of a selected range to its edge position. The remaining components and operations are the same as those in the third embodiment. Hence, the same reference numerals denote the same components and operations, and a detailed description thereof will be omitted.

(List Display of Embodiment)

Figure 15:
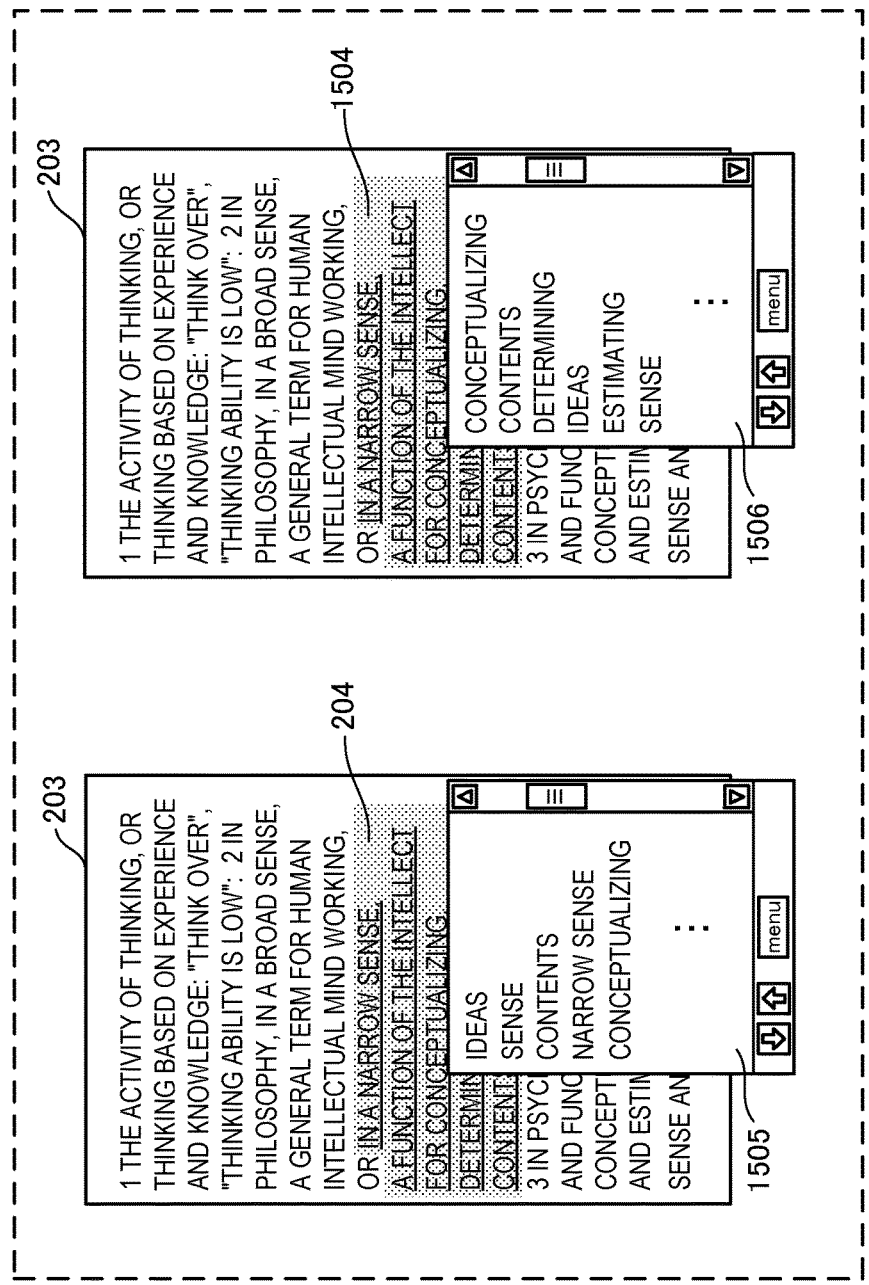
FIG. 15 is a view for explaining list display of selection candidates in an information processing apparatus according to the fourth embodiment of the present invention.

FIG. 15 is a view for explaining list display of selection candidates in the information processing apparatus according to this embodiment. An example of extracting document elements having an attribute indicating a word from a selected range and performing list display will be described with reference to FIG. 15. However, the same applies to extraction and list display of document elements having another attribute or a plurality of attributes. Note that in FIG. 15, the same reference numerals denote the same components as in FIGS. 2 and 3.

FIG. 15 is a view showing list display 1505 of words extracted from a selected range 204 and list display 1506 of words extracted from a different selected range 1504. In the list display 1505, words extracted in the order from the central portion of the selected range 204 to its edge portion are listed. On the other hand, in the list display 1506, words extracted in the order from the central portion of the selected range 1504 obtained by extending the selected range 204 backward to the edge portion of the selected range 1504 are listed.

By performing such control, the central portion of the selected range to which the user pays attention in a selection operation is preferentially listed, thereby making it possible to display a list so that the user can readily select a desired document element from list display.

(List Display Generator)

Figure 16:
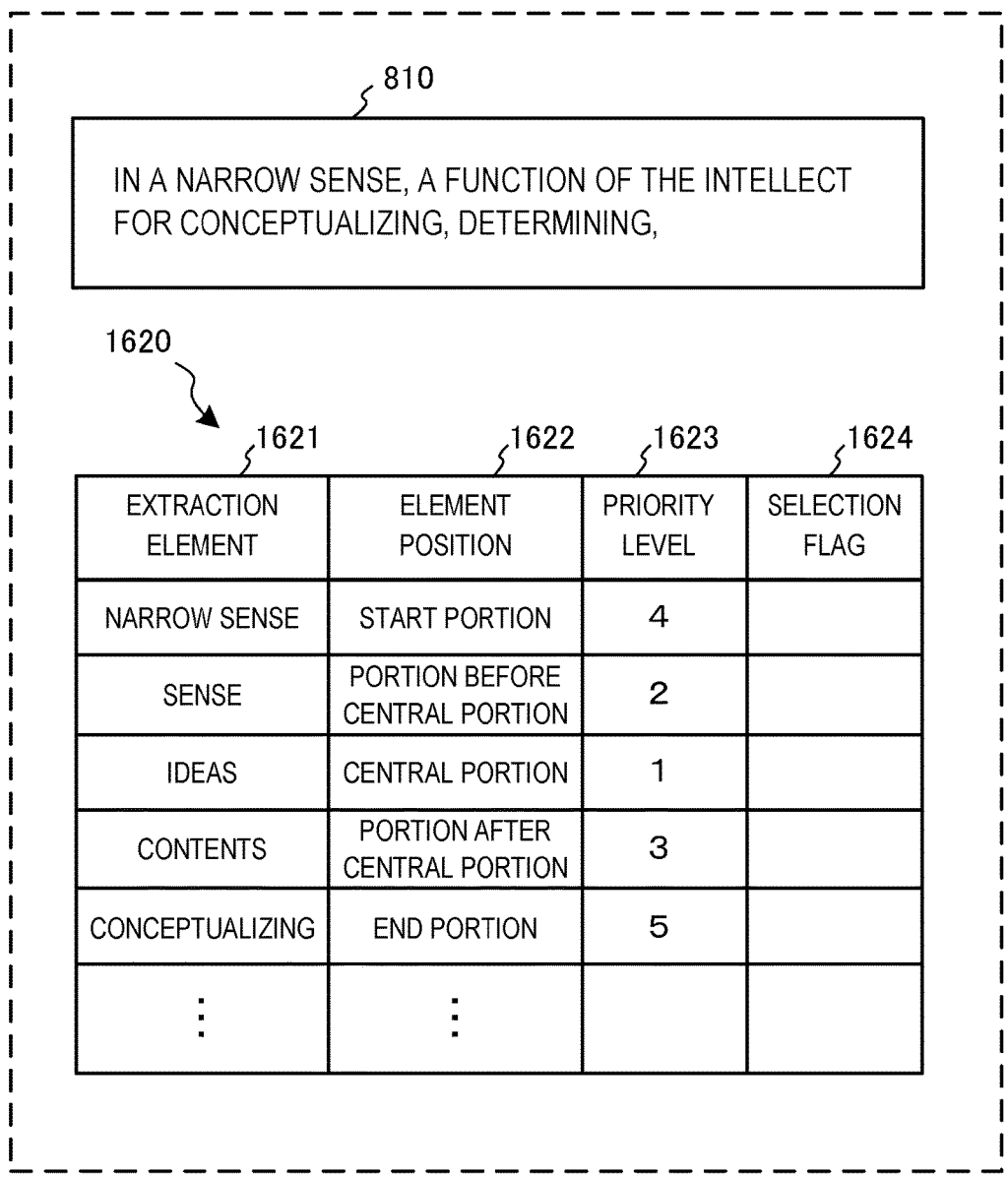
FIG. 16 is a view showing the structure of the stored information of a list display generator according to the fourth embodiment of the present invention.

FIG. 16 is a view showing the structure of the stored information of a list display generator 540 according to this embodiment. The storage unit of the list display generator 540 stores information to be used by a document element extractor 801, a list generator 802, and a document element selector 803. Note that in FIG. 16, the same reference numerals as in FIG. 8B denote the same components and a description thereof will be omitted.

A list storage unit 1620 shown in FIG. 16 is an arrangement example in which words extracted in the order from the central portion of the selected range 204 to its edge portion are listed. The list storage unit 1620 stores extraction elements 1621 extracted by the document element extractor 801 from a document in a document storage unit 810 based on attributes, and element positions 1622 of the extraction elements 1621 within the selected range. The list storage unit 1620 also stores priority levels 1623 for listing the extraction elements 1621 based on the element positions 1622, and selection flags 1624 each indicating selection by the document element selector 803. For example, "1" of the selection flag 1624 indicates that the corresponding extraction element has been selected. Although not shown in FIG. 16, an attribute may be stored in correspondence with each extraction element 1621, similarly to FIG. 8B.

(Element Extraction Processing within Selected Range)

Figure 17:
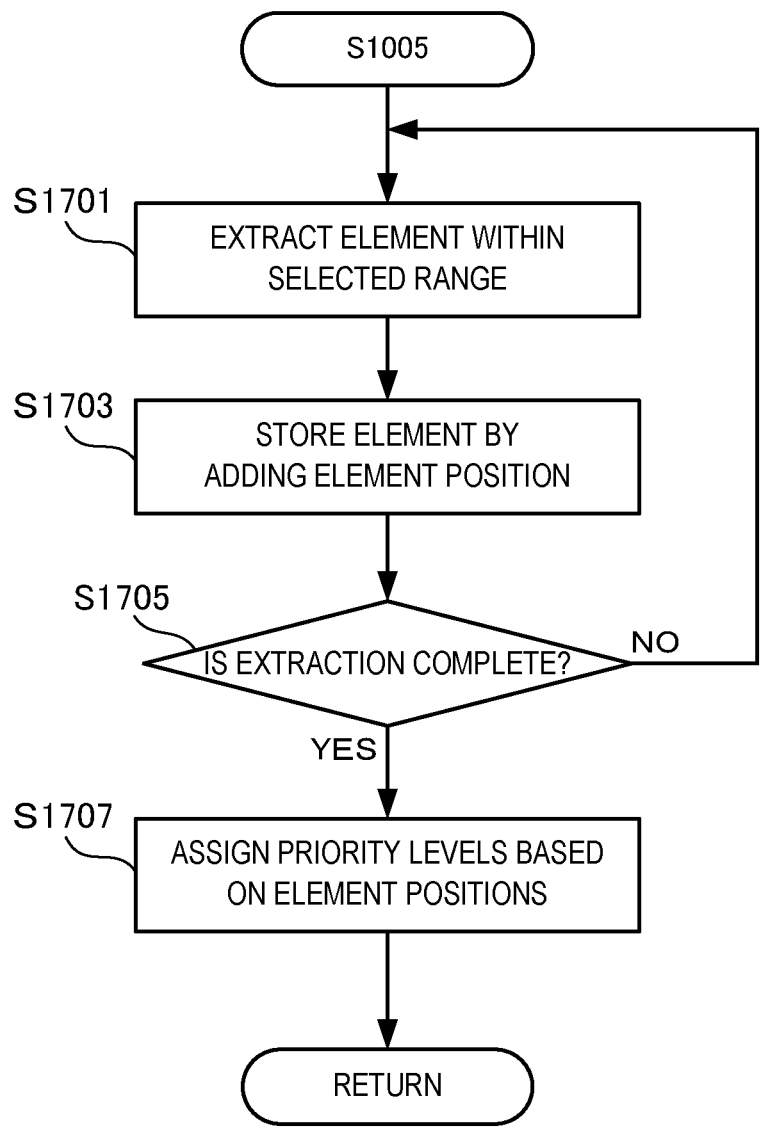
FIG. 17 is a flowchart illustrating the procedure of element extraction processing within a selected range according to the fourth embodiment of the present invention.

FIG. 17 is a flowchart illustrating the procedure of element extraction processing (S1005) within the selected range according to this embodiment.

In step S1701, a screen operation processor 410 extracts a document element having a predetermined attribute from the selected range. In step S1703, the screen operation processor 410 adds the position of the extracted document element within the selected range as an element position, and stores the resultant data in the list storage unit 1620.

In step S1705, the screen operation processor 410 waits for completion of extraction of document elements from the selected range. Upon completion of extraction of the document elements from the selected range, the screen operation processor 410 assigns, in step S1707, priority levels in the list to the extracted document elements based on the element positions, respectively.

According to this embodiment, by preferentially listing the central portion of the selected range to which the user pays attention in a selection operation, it is possible to display a list so that the user can readily select a desired document element from list display.

Fifth Embodiment

An information processing apparatus according to the fifth embodiment of the present invention will be described next. The information processing apparatus according to this embodiment is different from those according to the second to fourth embodiments in that document elements each having an attribute set by the user or application are extracted. The remaining components and operations are the same as those in the second to fourth embodiments. Hence, the same reference numerals denote the same components and operations, and a detailed description thereof will be omitted.

(List Display of Embodiment)

Figure 18:
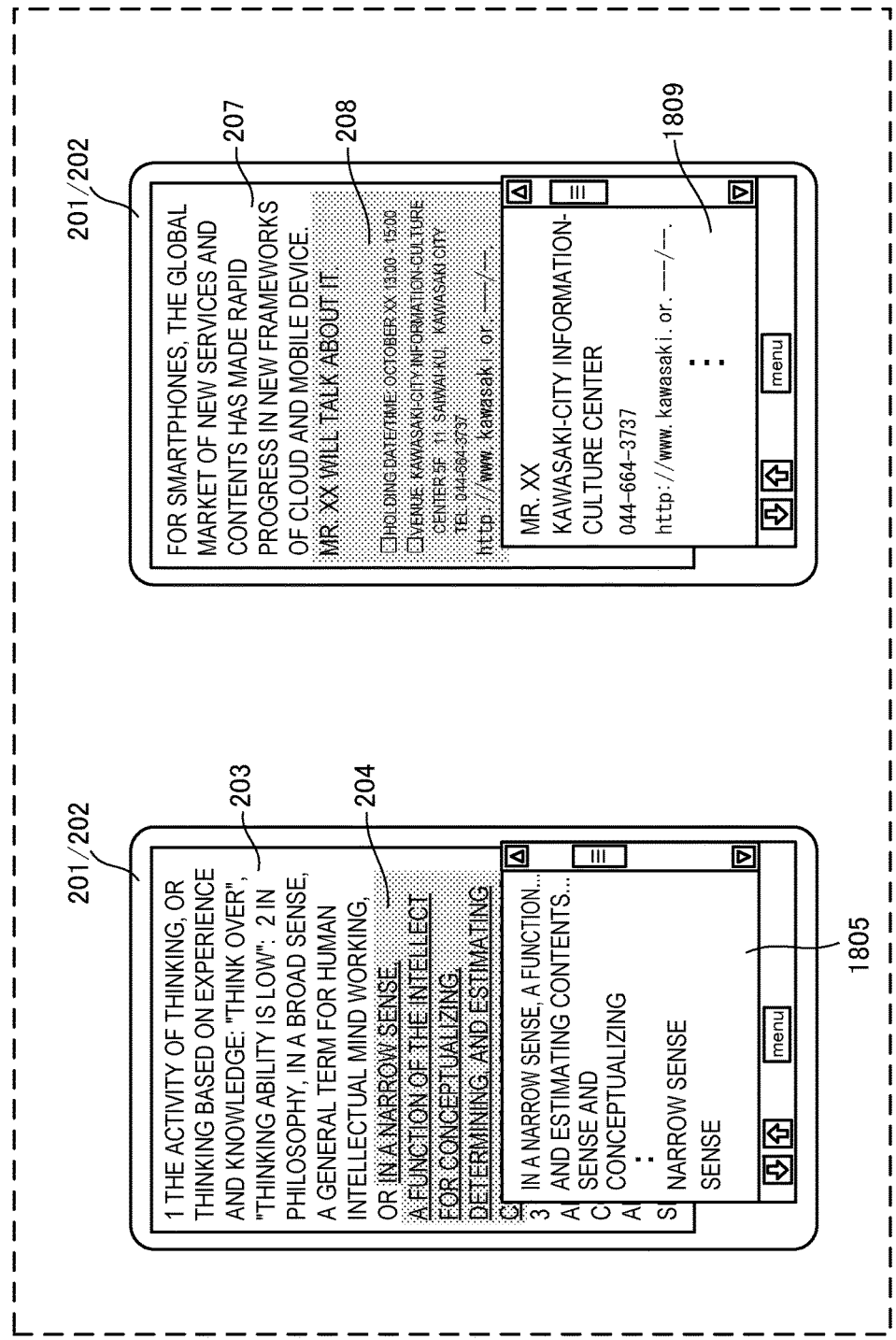
FIG. 18 is a view for explaining list display of selection candidates in an information processing apparatus according to the fifth embodiment of the present invention.

FIG. 18 is a view for explaining list display of selection candidates in the information processing apparatus according to this embodiment. Note that in FIG. 18, the same reference numerals denote the same components as in FIGS. 2 and 3.

The left view of FIG. 18 shows a state in which document elements each having an attribute set by the user or application have been extracted from a selected range 204 and list display 1805 has been performed. The left view of FIG. 18 shows an example in which "word", "word including postpositional particle", and "phrase" are set as attributes.

The right view of FIG. 18 shows a state in which document elements each having an attribute set by the user or application have been extracted from a selected range 208 in a display document 207 and list display 1809 has been performed. The right view of FIG. 18 shows an example in which "name", "facility name", "address", "telephone number", and "homepage address" are set as attributes.

As described above, when the user or application freely sets attributes of document elements to be extracted from a selected range, it is possible to display a list so that the user or application can readily select a currently desired document element.

(List Display Generator)

FIG. 19 is a view showing the structure of the stored information of a list display generator 540 according to this embodiment. The storage unit of the list display generator 540 stores information to be used by a document element extractor 801, a list generator 802, and a document element selector 803.

A document storage unit 1910 of the selected range of the document stores a document within the selected range. A list storage unit 1920 stores extraction elements 1922 extracted by the document element extractor 801 from the document in the document storage unit 1910 based on the attributes in correspondence with attributes 1921 of attributes 1 to n set by the user or application. Furthermore, the list storage unit 1920 stores selection flags 1923 each indicating that the document element selector 803 has selected the corresponding extraction element. Note that priority levels may be stored in the list storage unit 1920.

(Element Extraction Processing within Selected Range)

Figure 20:
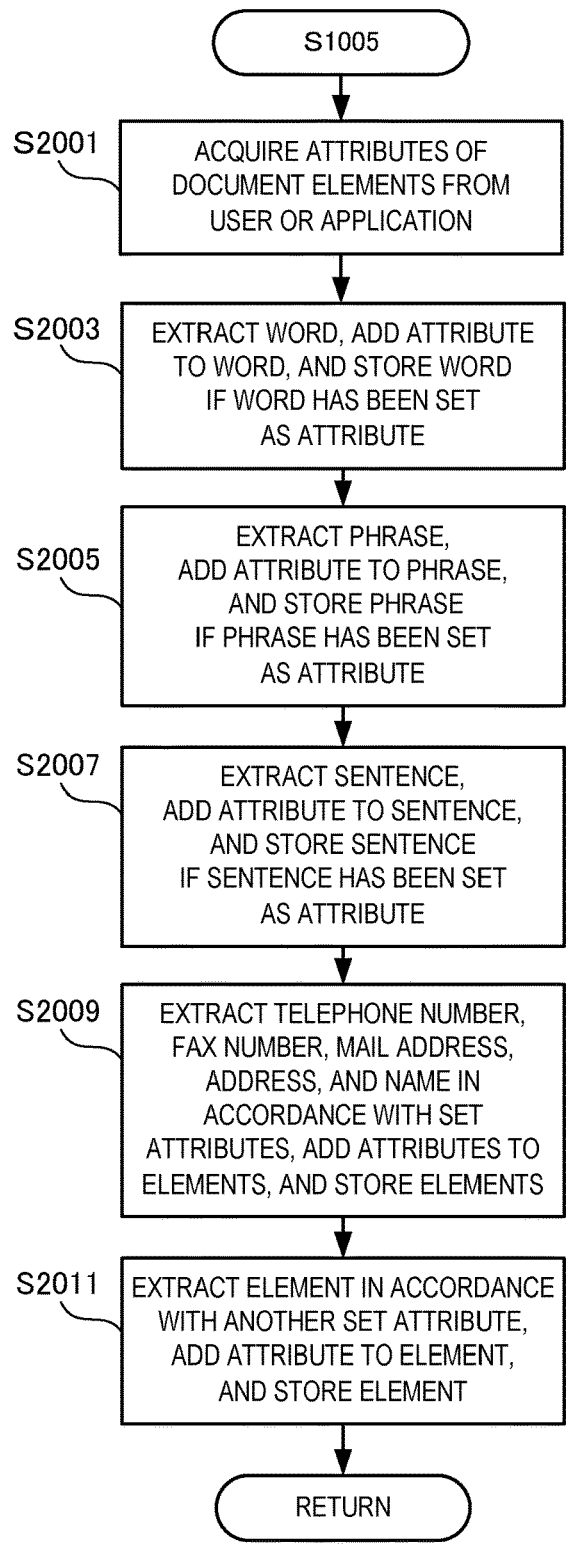
FIG. 20 is a flowchart illustrating the procedure of element extraction processing within a selected range according to the fifth embodiment of the present invention.

FIG. 20 is a flowchart illustrating the procedure of element extraction processing (S1005) within the selected range according to this embodiment.

In step S2001, a screen operation processor 410 acquires the attributes of document elements to be extracted from the selected range, which have been set by the user or application.

In step S2003, if "word" has been set as an attribute, the screen operation processor 410 extracts a word from the selected range, adds the attribute to it, and stores it in the list storage unit 1920. In step S2005, if "phrase" has been set as an attribute, the screen operation processor 410 extracts a phrase from the selected range, adds the attribute to it, and stores it in the list storage unit 1920. In step S2007, if "sentence" has been set as an attribute, the screen operation processor 410 extracts a sentence from the selected range, adds the attribute to it, and stores it in the list storage unit 1920. In step S2009, if "telephone number" and the like have been set as attributes, the screen operation processor 410 extracts document elements having the attributes from the selected range, adds the attributes to them, and stores them in the list storage unit 1920. In step S2011, if another attribute has been set, the screen operation processor 410 extracts a document element having the attribute from the selected range, adds the attribute to it, and stores it in the list storage unit 1920.

According to this embodiment, when the user or application freely sets attributes of document elements to be extracted from the selected range, it is possible to display a list so that the user or application can readily select a currently desired document element.

Sixth Embodiment

An information processing apparatus according to the sixth embodiment of the present invention will be described next. The information processing apparatus according to this embodiment is different from those according to the second to fifth embodiments in that list display of document elements extracted from a selected range of a display document is performed in accordance with a paste operation by the user at the time of document creation. The remaining components and operations are the same as those in the second to fifth embodiments. Hence, the same reference numerals denote the same components and operations, and a detailed description thereof will be omitted.

(List Display of Embodiment)

Figure 21:
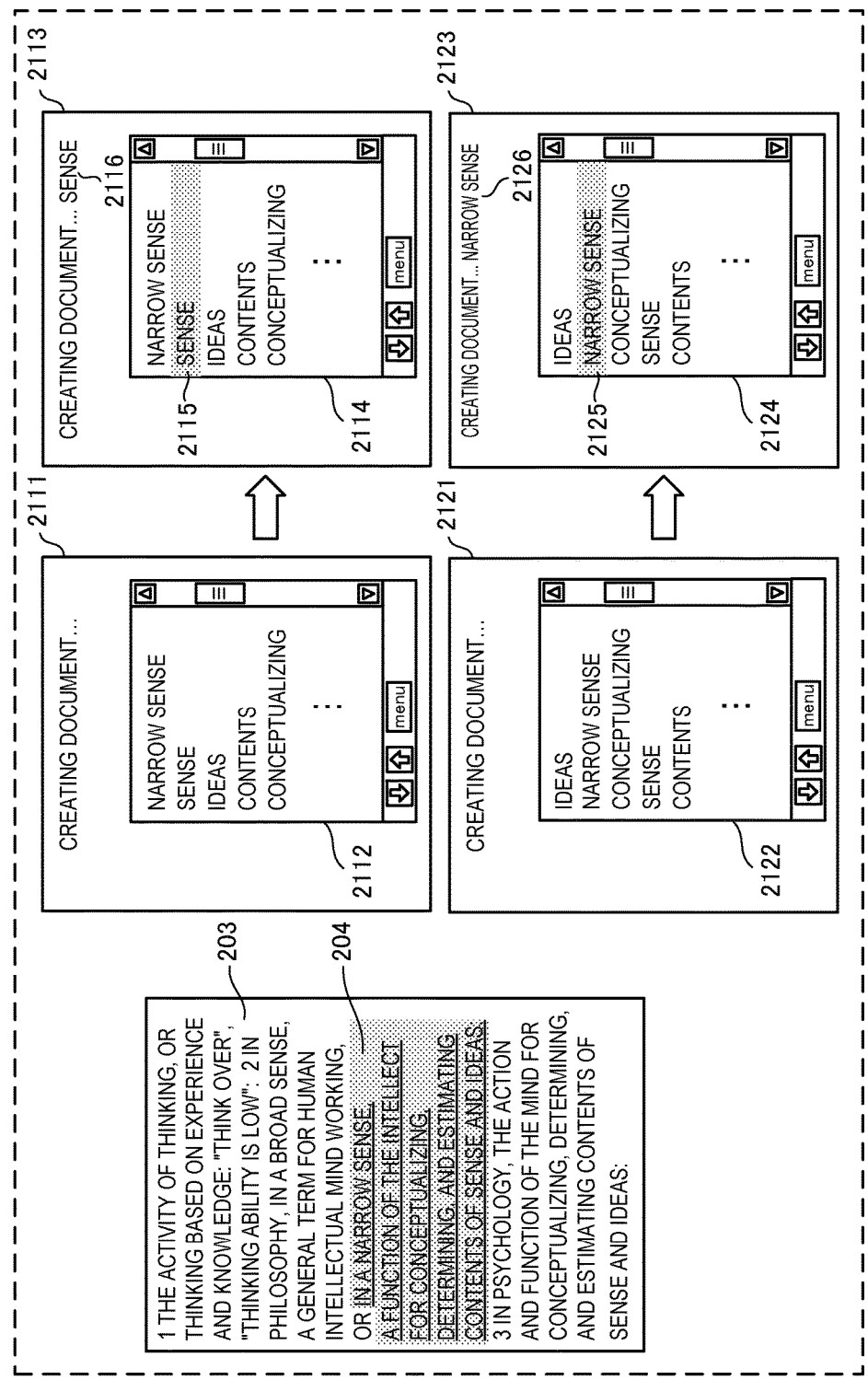
FIG. 21 is a view for explaining list display of selection candidates in an information processing apparatus according to the sixth embodiment of the present invention.

FIG. 21 is a view for explaining list display of selection candidates in the information processing apparatus according to this embodiment. An example of extracting document elements each having an attribute indicating a word from a selected range and performing list display will be described with reference to FIG. 21. However, the same applies to extraction and list display of document elements having another attribute or a plurality of attributes. Note that in FIG. 21, the same reference numerals denote the same components as in FIGS. 2 and 3.

The left view of FIG. 21 shows a selected range 204 of a display document 203. Display screens 2111, 2113, 2121, and 2123 on the right side of FIG. 21 are screens during document creation.

The display screen 2111 is a screen when the user instructs paste to a created document after selecting the selected range 204 of the display document 203. In the display screen 2111, list display 2112 of words extracted from the selected range 204 is superimposed and displayed. The display screen 2113 shows a state in which the user has selected and designated "sense" 2115 on the second line from the list display 2112. In the display screen 2113, the "sense" 2115 selected and designated by the user is pasted (see 2116).

The display screen 2121 is a screen when the user instructs paste to a created document after selecting the selected range 204 of the display document 203. In the display screen 2121, list display 2122 of words extracted from the selected range 204, which has priority levels different from those of the list display 2112, is superimposed and displayed. The display screen 2123 shows a state in which the user has selected and designated "narrow sense" 2125 on the second line from the list display 2122. In the display screen 2123, the "narrow sense" 2125 selected and designated by the user is pasted (see 2126).

As described above, in a copy operation from another document or a self document at the time of document creation, a range including a necessary word is selected and list display of elements each having an attribute indicating a word is performed without accurately selecting a word or the like from a small display screen, thereby selecting a desired word. This processing improves the operability of the copy operation. The operability is further improved by appropriately setting an attribute.

<<Functional Arrangement of Screen Operation Processor>>

Figure 22:
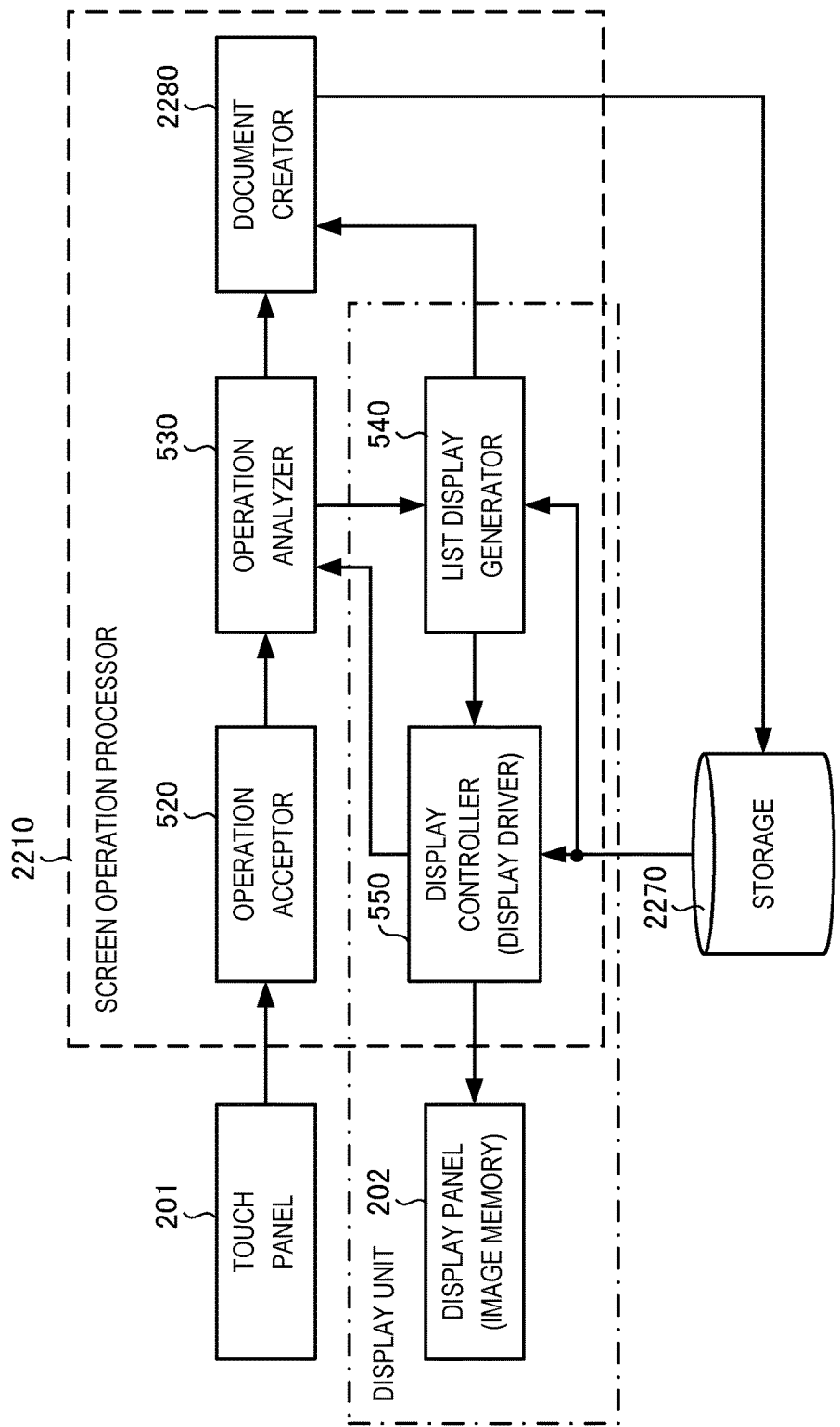
FIG. 22 is a block diagram showing the functional arrangement of a screen operation processor according to the sixth embodiment of the present invention.

FIG. 22 is a block diagram showing the functional arrangement of a screen operation processor 2210 according to this embodiment. Note that in FIG. 22, the same reference numerals as in FIG. 5 denote the same functional components and a description thereof will be omitted.

A display information DB 2270 stores a document during creation in addition to a display document in which a selected range is designated, and a display controller 550 displays the document on a display panel 202. A document creator 2280 creates a document using a function including hiragana-kanji conversion processing and paste processing.

Note that the document creator 2280 need not be included in the screen operation processor 2210.

(Document Creator)

Figure 23:
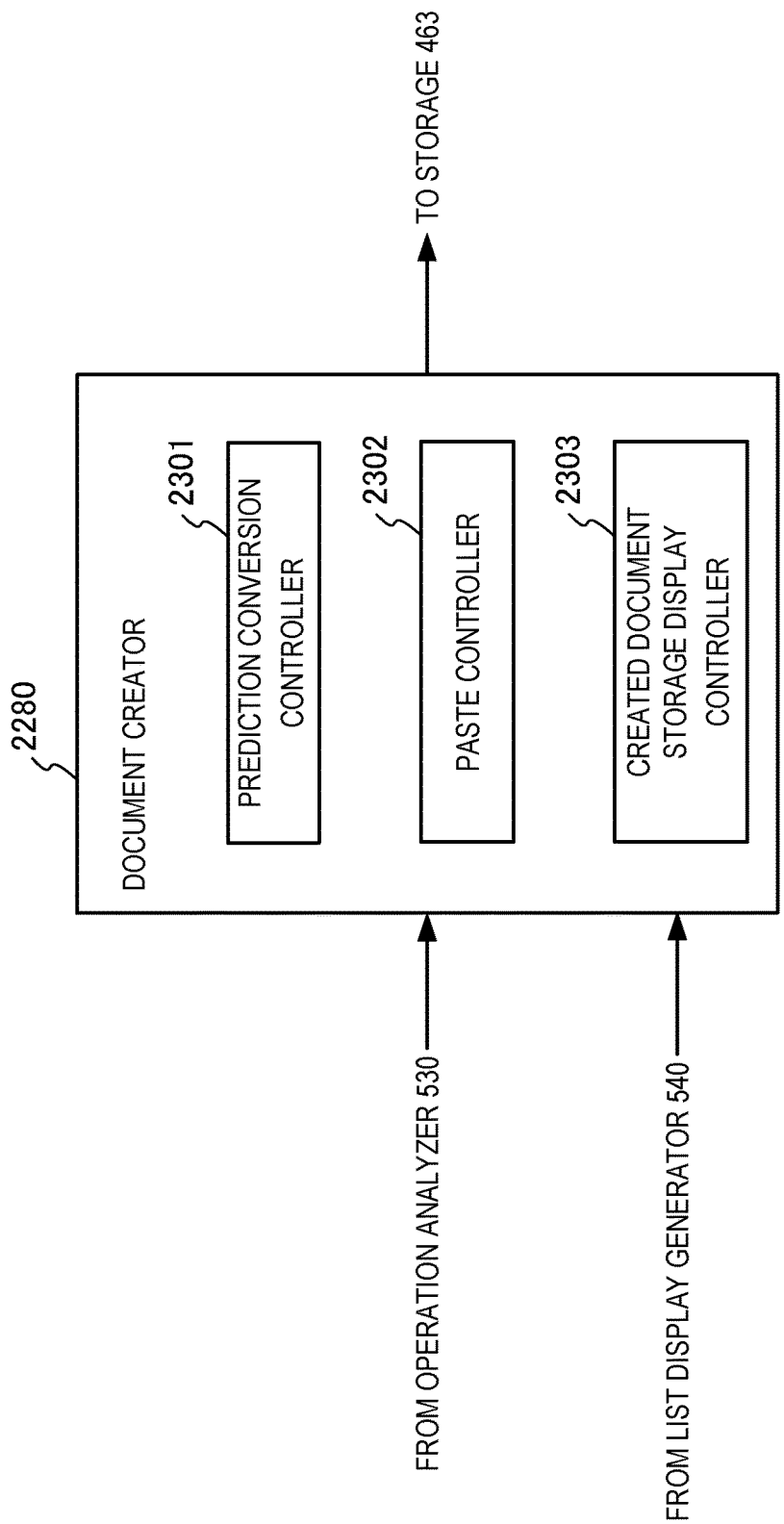
FIG. 23 is a block diagram showing the functional arrangement of a document creator according to the sixth embodiment of the present invention.

FIG. 23 is a block diagram showing the functional arrangement of the document creator 2280 according to this embodiment.

The document creator 2280 includes a prediction conversion controller 2301, a paste controller 2302, and a created document storage display controller 2303. The prediction conversion controller 2301 performs, for a user input, prediction conversion processing such as hiragana-kanji conversion processing or word conversion processing from letters. The paste controller 2302 controls a paste operation included in a copy operation from range designation of the user according to this embodiment. The created document storage display controller 2303 controls storage of the document during creation and display on the display panel 202.

(List Display Generator or Document Creator)

Figure 24:
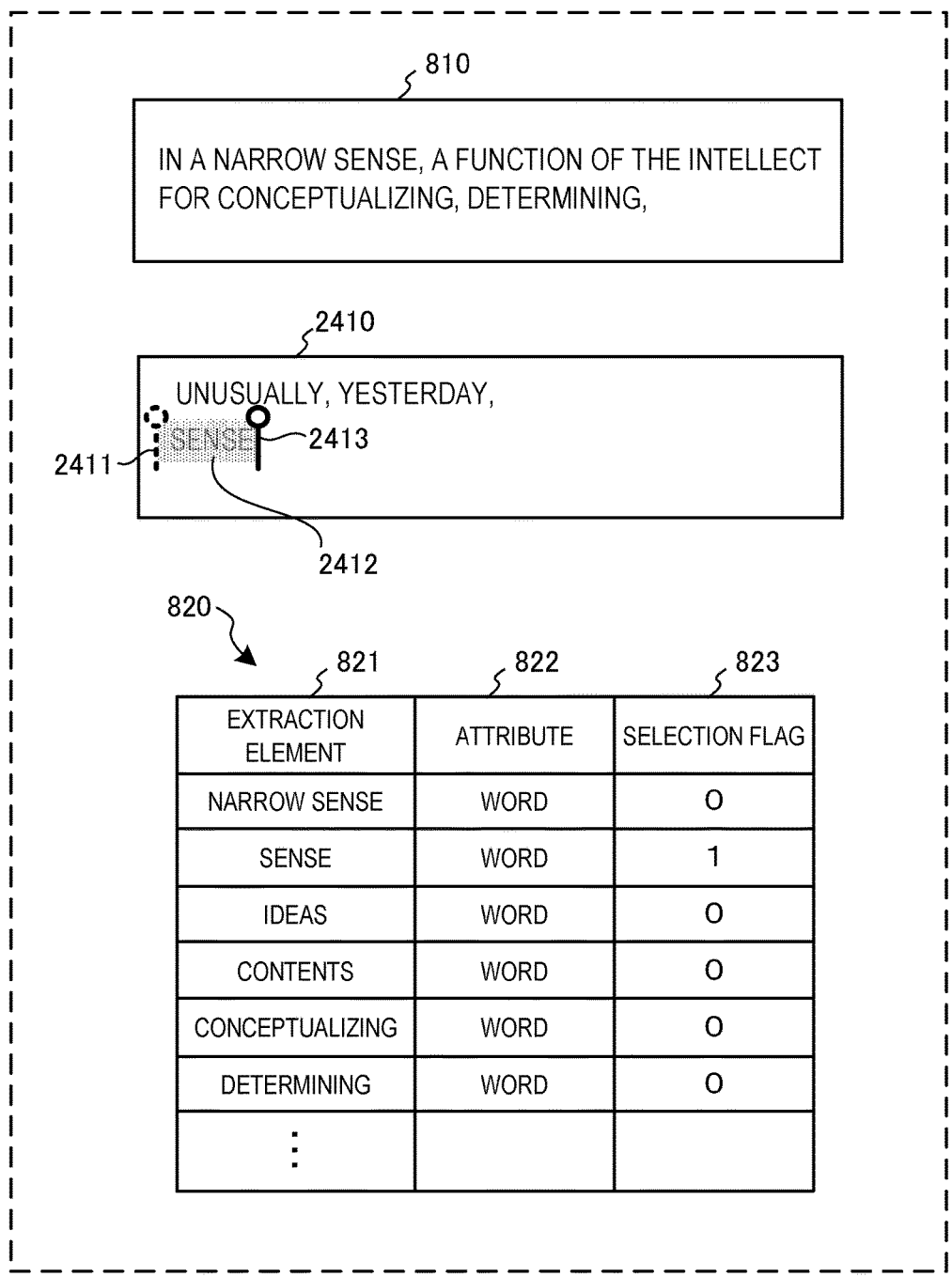
FIG. 24 is a view showing the structure of the stored information of a list display generator or the document creator according to the sixth embodiment of the present invention.

FIG. 24 is a view showing the structure of the stored information of a list display generator 540 or the document creator 2280 according to this embodiment. Note that in FIG. 24, the same reference numerals as in FIG. 8B denote the same components and a description thereof will be omitted.

A created document storage unit 2410 stores a document during creation. A cursor 2411 indicates a cursor position before a copy operation. In a paste operation after a document storage unit 810 of the selected range is selected, the list display 2112 of words extracted from the selected range is performed, as in the display screen 2111 shown in FIG. 21. If the "sense" 2115 is designated, "sense" 2412 is pasted to the created document. The cursor 2411 moves to a position of a cursor 2413.

(Procedure of Screen Operation Processing Including Document Creation Processing)

Figure 25:
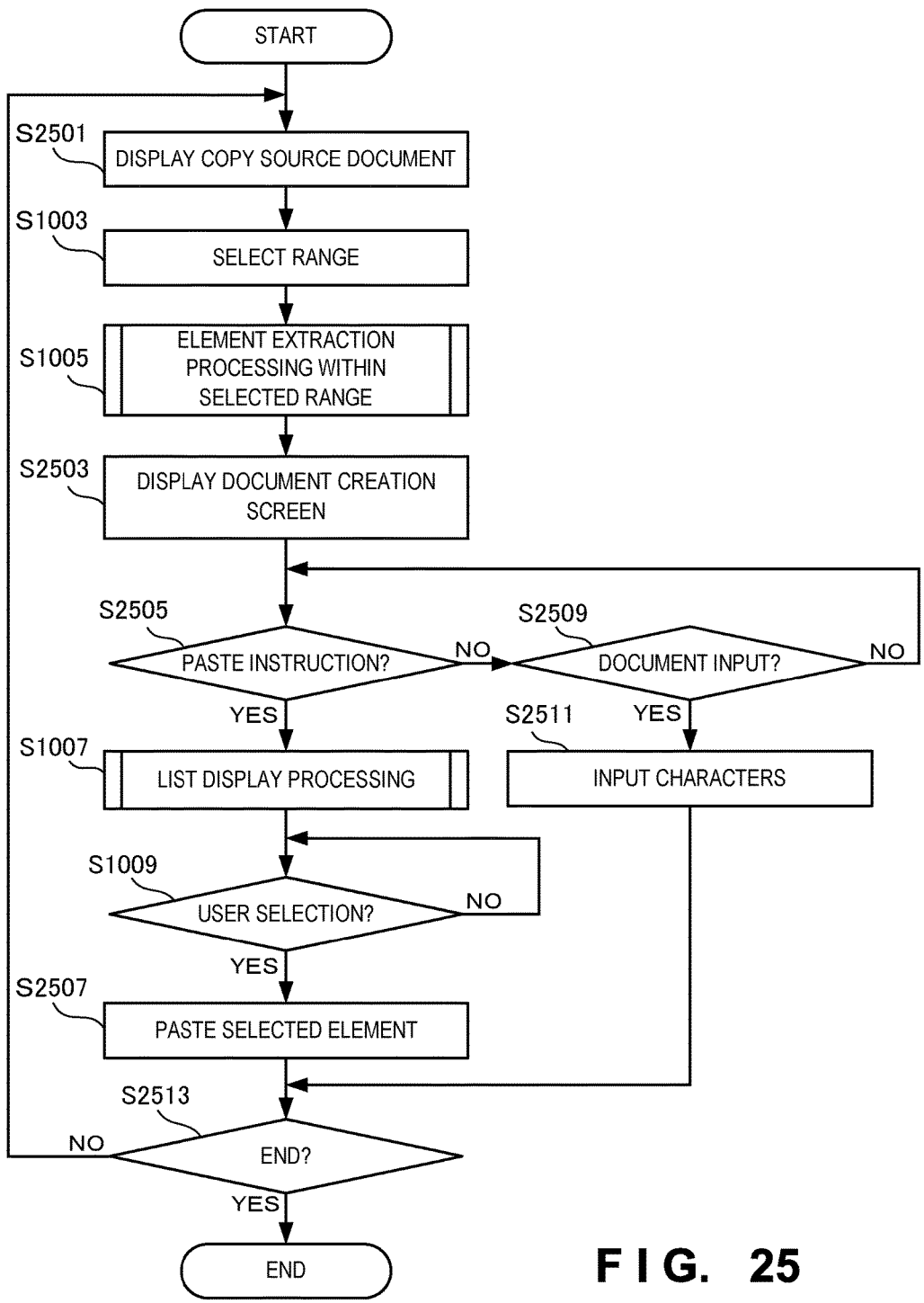
FIG. 25 is a flowchart illustrating the procedure of screen operation processing including document creation processing by the information processing apparatus according to the sixth embodiment of the present invention.

FIG. 25 is a flowchart illustrating the procedure of screen operation processing including document creation processing by the information processing apparatus according to this embodiment. This flowchart implements the respective functional components of a screen operation processor 410 when executed by a processor 400 or the CPU of the screen operation processor 410. A case in which the CPU of the screen operation processor 410 executes the flowchart will be described. Note that in FIG. 25, the same step numbers as in FIG. 10 denote the same steps and a description thereof will be omitted.

In step S2501, the screen operation processor 410 displays a copy source document. The screen operation processor 410 selects a range of the display document in step S1003, and executes element extraction processing in step S1005.

In step S2503, the screen operation processor 410 displays a document creation screen on a display panel 202 in accordance with a user instruction. In step S2505, the screen operation processor 410 determines whether a paste instruction is sent. If the paste instruction is sent, the screen operation processor 410 executes list display processing in step S1007. In step S1009, the screen operation processor 410 waits for user selection from list display. If user selection is made, the screen operation processor 410 pastes, in step S2507, a document element selected by the user from the list display to a cursor position on the created document.

On the other hand, if no paste instruction is sent, the screen operation processor 410 determines in step S2509 whether a document is input by the user. If the document is input, the screen operation processor 410 inserts, in step S2511, input characters to the cursor position on the created document.

In step S2513, the screen operation processor 410 determines whether document creation ends. If document creation does not end, the screen operation processor 410 returns to step S2501 to repeat the processing. Note that if copy processing is not that from an existing source document, list display is skipped.

According to this embodiment, a range including a necessary document element is selected, list display is performed, and a desired document element is selected and pasted, thereby improving the operability of a copy operation.

Seventh Embodiment

An information processing apparatus according to the seventh embodiment of the present invention will be described next. The information processing apparatus according to this embodiment is different from those according to the second to sixth embodiments in that document elements extracted from a selected range of a display document are preferentially displayed in a prediction conversion list in accordance with conversion processing of input characters at the time of document creation. The remaining components and operations are the same as those in the second to sixth embodiments. Hence, the same reference numerals denote the same components and operations, and a detailed description thereof will be omitted.

(List Display of Embodiment)

Figure 26:
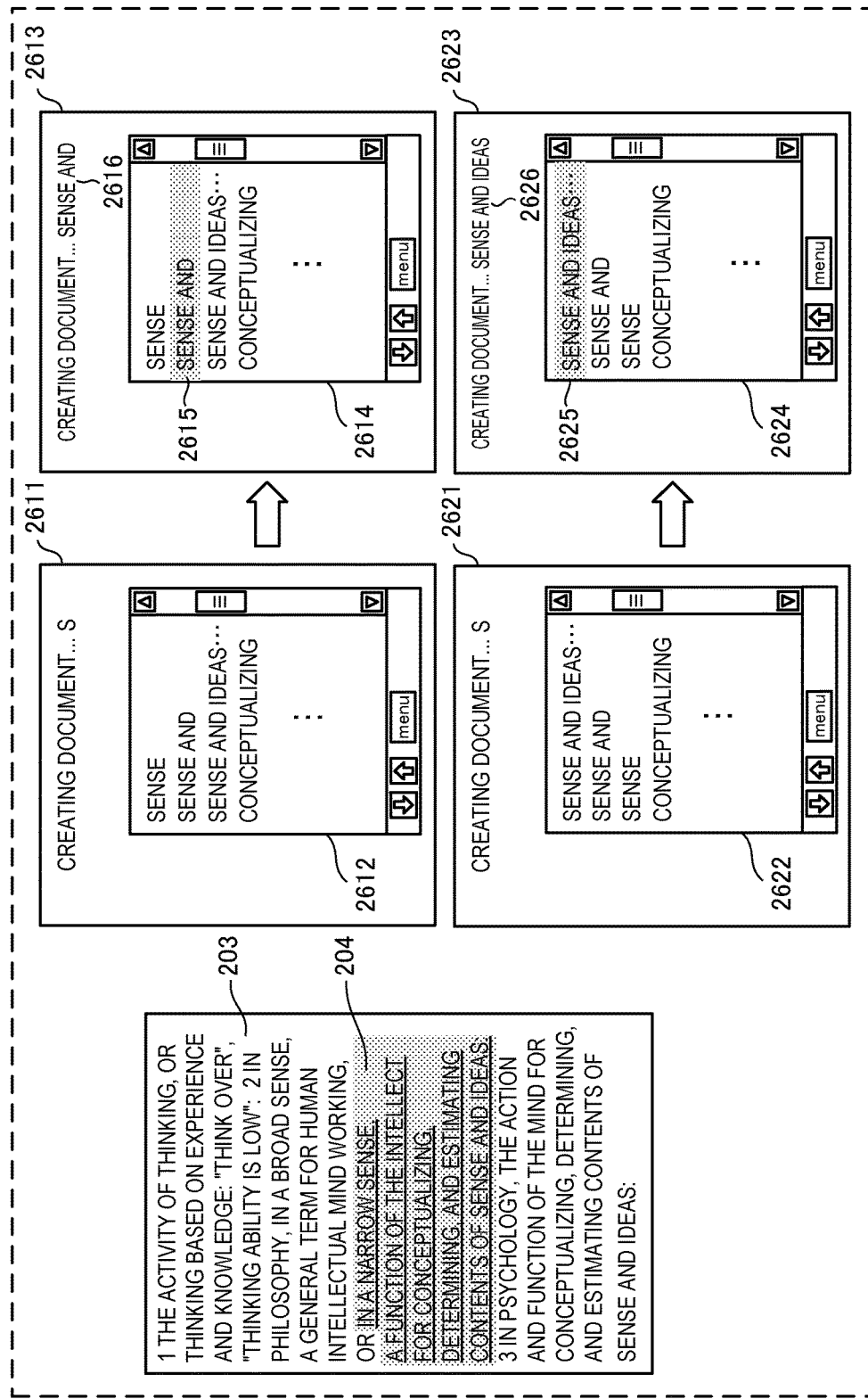
FIG. 26 is a view for explaining list display of selection candidates in an information processing apparatus according to the seventh embodiment of the present invention.

FIG. 26 is a view for explaining list display (prediction conversion list) of selection candidates in the information processing apparatus according to this embodiment. An example of extracting document elements each having an attribute indicating a word from a selected range and performing list display will be described with reference to FIG. 26. However, the same applies to extraction and list display of document elements having another attribute or a plurality of attributes. Note that in FIG. 26, the same reference numerals denote the same components as in FIGS. 2 and 3.

The left view of FIG. 26 shows a selected range 204 of a display document 203. Display screens 2611, 2613, 2621, and 2623 on the right side of FIG. 26 are screens during document creation.

The display screen 2611 is a screen when the user inputs "s" to a created document after selecting the selected range 204 of the display document 203. In the display screen 2611, list display 2612 of document elements starting with "s" or "c" extracted from the selected range 204 is superimposed and displayed. In the display screen 2611, list display is performed in the order of words starting with "s", phrases starting with "s", and words starting with "c". The display screen 2613 shows a state in which the user has selected and designated "sense and" 2615 on the second line from the list display 2612. In the display screen 2613, prediction conversion is performed into the "sense and" 2615 selected and designated by the user (see 2616).

The display screen 2621 is a screen when the user inputs "s" to a created document after selecting the selected range 204 of the display document 203. In the display screen 2621, list display 2622 of document elements starting with "s" or "c" extracted from the selected range 204, which has priority levels different from those of the list display 2612, is superimposed and displayed. In the display screen 2621, list display is performed in the order of phrases starting with "s", words starting with "s", and words starting with "c". The display screen 2623 shows a state in which the user has selected and designated "sense and ideas" 2625 on the first line from the list display 2622. In the display screen 2623, prediction conversion is performed into the "sense and ideas" 2625 selected and designated by the user (see 2626).

As described above, in prediction conversion at the time of document creation, by selecting a range from a document currently created by the user or a related document, it is possible to perform prediction conversion by performing list display by setting an attribute indicating a word in correspondence with the input character "s", and selecting a desired word. Such processing improves the operability of a prediction conversion operation. The operability is further improved by appropriately setting the attribute or the relationship between an input character and document elements to be extracted.

(List Display Generator or Document Creator)

FIG. 27 is a view showing the structure of the stored information of a list display generator 540 or a document creator 2280 according to this embodiment. Note that in FIG. 27, the same reference numerals as in FIG. 8B or 24 denote the same components and a description thereof will be omitted.

A created document storage unit 2410 stores a document during creation. A cursor 2711 indicates a cursor position before a character input operation. In a character input operation after a document storage unit 810 of the selected range is selected, if "s" is input, the list display 2612 of words extracted from the selected range is performed, as in the display screen 2611 shown in FIG. 26. If the "sense and" 2615 is designated, "sense and" 2612 undergoes prediction conversion and is pasted to the created document. Note that "sense and" is shown in FIG. 27 but "sen" is not shown for descriptive convenience. The cursor 2711 moves to a position of a cursor 2713.

The list storage unit 2720 stores conversion candidates 2721 starting with the input character "s" or "c", list display priority levels 2722, and selection flags 2723 each indicating selection by a document element selector 803. The conversion candidates 2721 include extraction candidates 2725 extracted by a document element extractor 801 from the document in the document storage unit 810 based on the attributes and normal candidates 2726 based on a conversion dictionary. The extraction candidates 2725 are preferentially displayed in a list. In the priority levels 2722, "-" indicates a higher priority level. Note that although not shown in FIG. 27, an attribute may be stored in a correspondence with each conversion candidate 2721, similarly to FIG. 8B.

The extraction candidates 2725 are effective for prediction conversion in this document creation processing but are obtrusive in subsequent processing, and are thus desirably deleted after the processing.

(Procedure of Screen Operation Processing Including Document Creation Processing)

Figure 28:
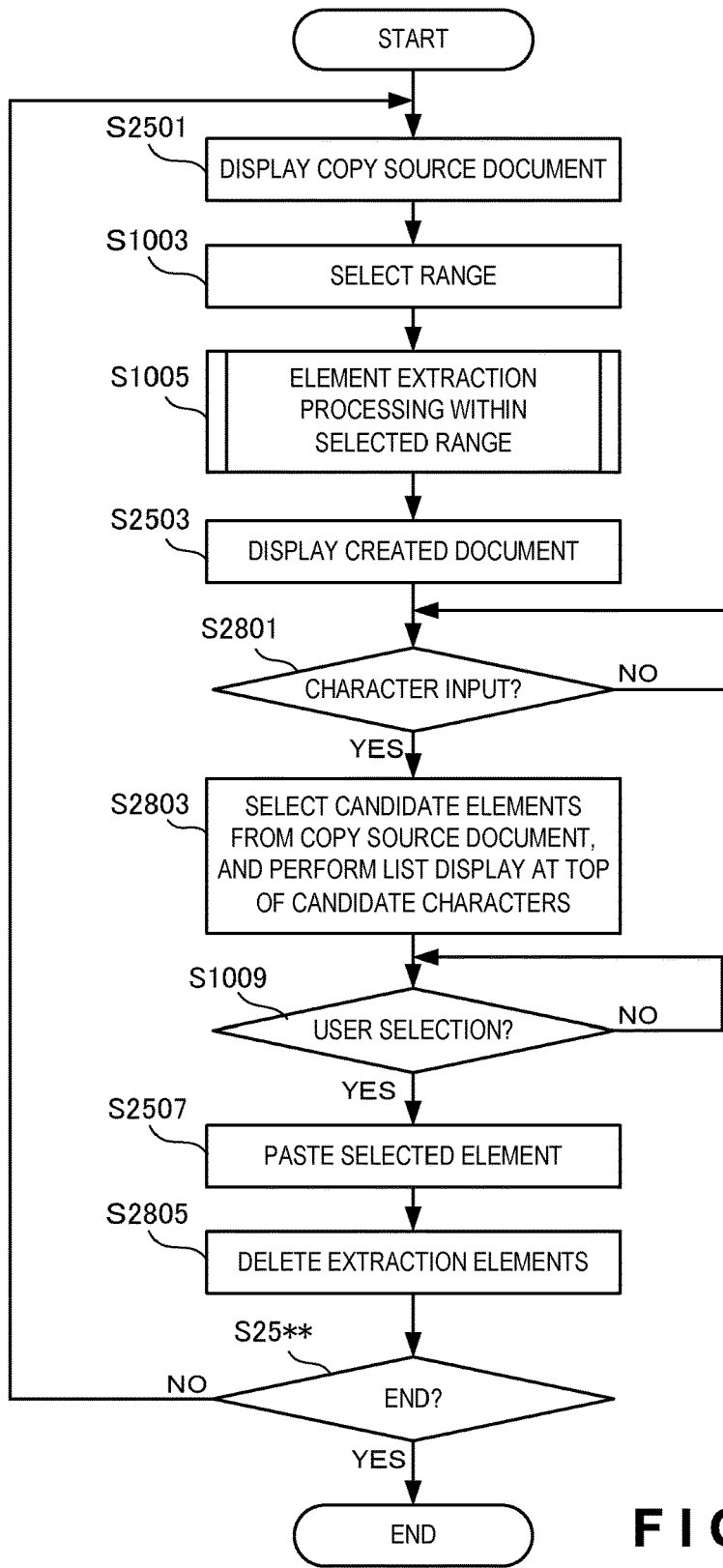
FIG. 28 is a flowchart illustrating the procedure of screen operation processing including document creation processing by the information processing apparatus according to the seventh embodiment of the present invention.

FIG. 28 is a flowchart illustrating procedure of screen operation processing including document creation processing by the information processing apparatus according to this embodiment. This flowchart implements the respective functional components of a screen operation processor 410 when executed by a processor 400 or the CPU of the screen operation processor 410. A case in which the CPU of the screen operation processor 410 executes the flowchart will be described. Note that in FIG. 28, the same step numbers as in FIG. 10 or 25 denote the same steps and a description thereof will be omitted.

In step S2801, the screen operation processor 410 determines whether a character is input to the created document. If a character is input, the screen operation processor 410 extracts candidate elements based on attributes from a copy source document and performs list display of the candidate elements at the top of candidate characters in step S2803.

In step S2805, the screen operation processor 410 deletes the extraction elements from conversion candidates.

According to this embodiment, by selecting a range from a document currently created by the user or a related document, it is possible to perform list display of document elements within the selected range in correspondence with an input character, and select a desired document element, thereby performing prediction conversion. Therefore, the operability of a prediction conversion operation is improved. The operability is further improved by appropriately setting an attribute or the relationship between an input character and document elements to be extracted.

Other Embodiments

In the above embodiments, selection of document elements from a display document in a smartphone or tablet for which the user performs an input or instruction operation using a touch panel has been explained. Application of the technique according to the present invention is not limited to the smartphone or tablet. The technique is applicable to another information processing apparatus for which the user performs an input or instruction operation using a touch panel and to selection of document elements from a display document using a keyboard or pointing device without limitation to the touch panel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. An information processing apparatus comprising:
a memory configured to store instructions; and
at least one processor configured to execute the stored instructions to implement:
an extractor that extracts document elements included in a selected range in a document based on attributes of the document elements;
a storage unit that stores the document elements extracted by the extractor, attributes of the document elements and selection flags;
a list generator that generates a list of the stored document elements in an order determined by as user;
a document element selector that selects a desired document element from the list based on the order determined by the user; and
an inserter that inserts the selected document element in the document;
wherein the selection flags are updated with the selection by the document element selector.

2. The information processing apparatus according to claim 1, wherein the document elements are document components having an attribute indicating at least one of a word, phrase, sentence, and paragraph included in the selected range.

3. The information processing apparatus according to claim 1, wherein the document elements are information elements having an attribute indicating at least one of a name, location, telephone number, and mail address included in the selected range.

4. The information processing apparatus according to claim 1, wherein the attributes of the document elements include at least one of a kanji character, hiragana character, katakana character, letter, numeral, and symbol.

5. The information processing apparatus according to claim 1, the information processing apparatus further comprises a display unit which performs a list display of the document elements extracted by the extractor in accordance with priority levels set by one of a user and an application.

6. The information processing apparatus according to claim 1, wherein the at least one processor is further configured to execute the stored instructions to implement:
a setting unit that sets the attributes, the bases of which are used by the extractor to extract the document elements included in the selected range.

7. The information processing apparatus according to claim 1, wherein said extractor extracts the document elements in accordance with a paste operation executed by the user, to a predetermined position within the selected range.

8. The information processing apparatus according to claim 1, the information processing apparatus further comprising a display unit which preferentially displays, in a prediction conversion list, the document elements extracted by the extractor in accordance with prediction conversion processing into a document input.

9. An information processing method comprising:
extracting document elements included in a selected range in a document based on attributes of the document elements;
storing the extracted document elements, attributes of the document elements, and selection flags;
generating a list of the stored document elements in an order determined by a user;
selecting a desired document element from the list based on the order determined by the user; and
inserting the selected document element in the document,
wherein the selection flags are updated based on the selected desired document element.

10. A non-transitory computer readable medium storing a program for causing at least one processor to execute instructions to:
extract document elements included in a selected range in a document based on attributes of the document elements;
store the extracted document elements, attributes of the document elements and selection flags;
generate a list of the stored document elements in a order determined by a user;
select a desired document element from the list based on the order determined by the user; and
insert the selected document element in the document;
wherein the selection flags are updated with the selection by the document element selector.

* * * * *

UNITED STATES PATENT AND TRADEMARK OFFICE
CERTIFICATE OF CORRECTION

| | |
|---|---|
| PATENT NO. | : 10,067,921 B2 |
| APPLICATION NO. | : 15/127318 |
| DATED | : September 4, 2018 |
| INVENTOR(S) | : Satoru Ishii and Tatsushi Yasuda |

Page 1 of 1

It is certified that error appears in the above-identified patent and that said Letters Patent is hereby corrected as shown below:

In the Claims

Column 18, Claim 1, Line 42; "as" has been replaced with --a-- therefor

Column 19, Claim 6, Line 6; "bases" has been replaced with --basis-- therefor

Column 20, Claim 10, Line 16; "a" has been replaced with --an-- therefor

Signed and Sealed this
Twenty-ninth Day of January, 2019

Andrei Iancu
*Director of the United States Patent and Trademark Office*